(12) United States Patent
Hsu

(10) Patent No.: US 7,020,326 B1
(45) Date of Patent: *Mar. 28, 2006

(54) SYSTEM FOR GUIDING USERS TO FORMULATE AND USE OBJECT EXTRACTION RULES

(76) Inventor: Shin-yi Hsu, 2312 Hemlock La., Vestal, NY (US) 13850

( * ) Notice: Subject to any disclaimer, the term of this patent is extended or adjusted under 35 U.S.C. 154(b) by 38 days.

This patent is subject to a terminal disclaimer.

(21) Appl. No.: 10/623,089

(22) Filed: Jul. 18, 2003

Related U.S. Application Data

(62) Division of application No. 09/191,394, filed on Nov. 13, 1998, now Pat. No. 6,724,931.

(51) Int. Cl.
*G06K 9/62* (2006.01)

(52) U.S. Cl. .............. 382/155; 382/113; 382/190; 704/4

(58) Field of Classification Search ........... 382/100, 382/181, 190, 229, 113, 155; 345/763, 418, 345/810, 961, 966, 965, 848, 967, 700, 764, 345/762; 707/1, 3, 103 R, 4, 2; 358/527; 717/100, 104, 117, 136, 114; 704/251, 231, 704/200, 4; 706/920, 45, 919; 719/315, 719/313, 316

See application file for complete search history.

(56) References Cited

U.S. PATENT DOCUMENTS

| | | | |
|---|---|---|---|
| 5,234,346 A * | 8/1993 | Rice ........................ 434/316 |
| 5,341,439 A | 8/1994 | Hsu | |
| 5,710,900 A * | 1/1998 | Anand et al. ............. 345/764 |
| 5,721,938 A * | 2/1998 | Stuckey ...................... 704/4 |
| 5,751,286 A * | 5/1998 | Barber et al. ............. 345/835 |
| 5,778,378 A * | 7/1998 | Rubin .................... 707/103 R |
| 5,793,888 A * | 8/1998 | Delanoy ................... 382/219 |
| 5,914,720 A * | 6/1999 | Maples et al. ............ 345/419 |
| 6,201,948 B1 * | 3/2001 | Cook et al. .............. 434/350 |
| 6,724,931 B1 * | 4/2004 | Hsu ........................ 382/155 |

OTHER PUBLICATIONS

The Elements of Artifical Intelligence: An Introduction using LISP (Tanimoto, Steven L., Computer Science Press, P. 400 et seq.

"The Interaction between Hardware, Software and Algorithms," in Duff and Levialdi.

Languages and Architecture for Image Processing (Duff, M.J.B. and Levialdi, S., editors, 1991: Academic Press) p. 18 at seq Picasso-Show, p. 39 L-Language, p. 48 et seq MAC, p. 95 et seq Pixal, and p. 113 IFL.

* cited by examiner

*Primary Examiner*—Sheela Chawan
(74) *Attorney, Agent, or Firm*—Mark Levy & Associates; David L. Banner

(57) ABSTRACT

A method of training a user to identify an object in an image, by querying a computer system having a lexicon of photo-interpreters to formulate object extraction rules. A database to be queried by an expert photo analyst is generated and a programming language is provided to generate extraction rules against that database. Graphical query results are displayed to determine whether an object has been identified. First, a hyperspectral image cube is represented by a set of fraction planes and texture transforms. Mean spectral reading values are obtained and used to build a pseudo multivariate distribution of the values. Recognizable features are then extracted from the hyperspectral image cube. A textural transform of a hyperspectral image cube results. The hundreds of image bands reduced to a few texture transforms can be used to train users of the image recognition system.

12 Claims, 30 Drawing Sheets

| Id | Size | Tone | Row Cent | Col Cent | Row Min | Row Max | Col Min | Col Max | Convo | Elong | Constr | Linear | Aspect | Inclin | Textur | Deviat | Divers | Max Tone | Min Tone | Coord |
|----|------|------|----------|----------|---------|---------|---------|---------|-------|-------|--------|--------|--------|--------|--------|--------|--------|----------|----------|-------|
| 1 | 172712 | 0 | 179.5 | 239.2 | 0 | 359 | 0 | 479 | 0 | 0 | 0 | 588 | 9424 | 0 | 0 | 0 | 0 | 0 | 0 | (0,0) (359,479) |
| 2 | 1 | 179 | 72.0 | 304.0 | 72 | 72 | 304 | 304 | 0 | 0 | 0 | 0 | 0 | 0 | 0 | 0 | 0 | 179 | 179 | (72,304) (72,304) |
| 3 | 87 | 145 | 97.4 | 158.7 | 92 | 103 | 154 | 163 | 0 | 0 | 0 | 360 | 10389 | 97 | 446 | 522 | 1703 | 153 | 121 | (92,154) (103,163) |

```
File  Edit  Format  Options

BANDS = 1;
MODIFY 1 = MEDIAN33;
modify 1 = expand ;

SHOW RULES = NO;
SHOW SEGMENTATION STATISTICS = NO;
SHOW MERGING STATISTICS = NO;
INITIAL CUTOFF = 5;
SEGMENTATION TYPE = local;
SHOW INITIAL SEGMENTATION = SLOW;
SHOW INITIAL SEGMENTATION = BW 50 65000;
MERGE = 40,1 STOPT 1;

SHOW #1 MERGE = SLOW;
SHOW #1 MERGE = BW 50 65000;
MERGE = 2 SPF = (1 500 1 500 -1000);
SHOW #2 MERGE = SLOW;
SHOW #2 MERGE = BW 50 65000;
SEEK LINEAR MODLINEAR NONLINEAR;
Seek small_dark_region non_linear_bright possible_tank;
REGION LINEAR: [#1 SIZE = (100 50000)] [#1 LINEARITY = (7000 10000)];
REGION MODLINEAR: [#1 SIZE = (100 50000)] [#1 LINEARITY = (5000 7000)];
REGION NONLINEAR: [#1 SIZE = (100 50000)] [#1 LINEARITY = (0 5000)];
    /* This is the object we are interested */
region small_dark_region: [#1 tone = (0 20)][#1 size = (50 1000)];
region nonlinear_bright: [is nonlinear][#1 tone = (200 255)]; .
    /* those are new objects defined */
TOP TITLE = "LINEAER=YELLOW MODLINEAR=CYAN NONLINEAR=MAGENTA" ;
BOTTOM TITLE = "LINEARITY: L(7000 10000) ML(5000 7000) NL(0 1000)" ;

DISPLAY LINEAR=YELLOW MODLINEAR=CYAN NONLINEAR=MAGENTA;
BW 1 DISPLAY LINEAR=YELLOW MODLINEAR=CYAN NONLINEAR=MAGENTA;
BW 1 DISPLAY NONLINEAR=MAGENTA;
top title = "possible_tank=magneta small_dark=yellow" ;

bw 1 display nonlinear=magenta small_dark=yellow
bw 1 display possible_tank=red;
```

/*
*/
BANDS = 9;
/* total number of band 91 with only 7 input bands, 2 additional
Bands are to be generated by IMaG. */

Modify 6 = expand;
/*band 6, thermal is expanded to a full 0=255 range */

BAND 8 = 0.85468 * :4: = 0.05493 * :5: - .24717 * :1: _ .6263 * :2:
         - .40639 * :3: - .11749 * :7:;   ⎫ 17a10
/* a greenness transform formula */

BAND 9 = (:6: > 140) * 250 ;               ⎫ 17a12
/* band 9 is defined by using band 6 as the base;
Any pixel with intensity value > 140 is coded as 250 */
```

Figure 17A

Seek Small_round_region Bright_region Sbr2dk ;
2410
Region Small_round_region 90:
  [#0 size 1 = (40 500)]
  [#0 elongation 1 - () 300)];
2416
Region Bright_region 70 : [#0 tone 1 = (120 255)];

Region Sbr2dk: [is Small_reound_region]
              [is Bright_region] ;

Top Title = "display sbr2dk=green, 50 sb22dk=red, 70" ;
Bw 1 display sbr2dk=green,50 sbr2dk=red,70 ;

Figure 24

```
Seek small_round_region bright_region sbr2dk;

Region small_round_region 90: [#1 size = (50 500)]
                              [#1 elongation 1 = (0 300)];

Region bright_region 70: [#1 tone 1 = (120 255)];

Region sbr2dk: [is small_round_region] 2610  2614
               [is bright_region];

Top title = "display sbr2dk=green, 70 sbr2dk=red,80" ;
                                                    2616
bw 1 display sbr2dk=green,70 sbr2dk=red,80 ;
                                     2612
```

Figure 26

SYSTEM FOR GUIDING USERS TO FORMULATE AND USE OBJECT EXTRACTION RULES

RELATED PATENT APPLICATIONS

This application is a divisional application of Ser. No. 09/191,394, filed Nov. 13, 1998 Now U.S. Pat. No. 6,724,931.

FIELD OF THE INVENTION

The present invention pertains to a system for object recognition and, more particularly, to a system for guiding users to formulate and use extraction rules to analyze an image and to recognize objects therein.

BACKGROUND OF THE INVENTION

Since the launch of the Earth Resources Technological Satellites (ERTS and now LANDSAT) in 1972, researchers in image processing and remote sensing have searched and continue to search for a better, more efficient way to extract objects from image data. One of the ways to achieve this goal has been through the use of higher technology hardware architectures, algorithms, and programming languages.

In the 1970s, this field was relatively new, and free thinking and approaches were highly encouraged. As a result, a number of innovative image processing languages were developed and tested. LANGUAGES AND ARCHITECTURE FOR IMAGE PROCESSING (Duff, M. J. B. and Levialdi, S., editors, 1991: Academic Press) discussed these early high level languages, providing examples which appeared, respectively, at the pages therein, referenced as follows: (1) PICASSO-SHOW, p. 18 et seq, (2) L-language, p. 39, (3) MAC, p. 48 et seq, (4) PIXAL, p. 95 et seq, and (5) IFL, p. 113. Also known is the LISP language, its use for image processing being described in THE ELEMENTS OF ARTIFICIAL INTELLIGENCE: An Introduction Using LISP (Tanimoto, Steven L., Computer Science Press, p. 400 et seq). Finally, as described hereinbelow, natural language has also been applied to image processing. As illustrated in Duff and Levialdi, none of these languages was English-like. Therefore, none could be understood by average, lay users.

In a general sense, a computer is designed to compute and solve a problem by using a software system. For the machine system to be very efficient, the software should be written with a low level language. This approach comes with a high price in developing and coding a solution algorithm. On the other end of the spectrum, developing and coding a high level language algorithm is much less costly; however, computing time is much longer. Therefore, one of the important aspects of computer science is to seek to optimize the machine/algorithm system by comprising from both ends, making the machine is an extension of the algorithm. The algorithm is also the extension of the machine system as noted by Wood in "The Interaction between Hardware, Software and Algorithms," in Duff and Levialdi. While this paradigm has worked very well for the past 40 years or more, the ability of users in problem solving is totally missing.

Since the early 1980s, researchers have noticed that under the hardware/software interaction paradigm, few people (except programmers) can truly communicate with a machine system. Attempting to correct this obvious deficiency, researchers have begun to develop human-based, and specifically, English-based interface systems as a part of natural language processing. The result has largely been in the domain of a man-machine dialogue, as shown in Table 1, reprinted from Duff and Levialdi, p. 218.

TABLE 1

An Example of Using English as a User/Machine Communication Means

What Fortran files do I have? /* a user asks the machine */
   GAUSS FOR
   GAUSS2 FOR/* the machine responds */
   MATRIX FOR The extension of this approach is the current standard query language (SQL) and expert system/knowledge based system.

While introduction of natural language processing into a hardware/software/algorithm system has integrated users into a problem solving system, the ability of a user is ignored, because a cognitive process in solving a problem has not taken place. This is true because: (1) the user cannot understand the language used in the algorithm; and (2) the English-based, man-machine dialogue boxes cannot guide the user to solve the problem. This condition has not changed since the mid-1980s, as evidenced by an expert system language called LISP, which was popular in the late 1980s, and IDL, a current, relatively high level interactive data language for image processing and visualization.

In summary, none of these historical and current image processing related languages has been able to guide the user to develop a solution algorithm, and improve his or her skills in object extraction by interacting with the vocabularies and syntax of the language. In other words, there has been no cognitive process in problem solving experienced by the users of these languages.

More generally, it has been found that any task, relatively simple or complex, in any field of endeavor, can be subject to learning by an unsophisticated or underskilled, but trainable user. Thus, the technique to which this invention is directed is applicable to a wide variety of subject matter, especially when combined with simulation systems, in fields including, but not limited to: medicine (surgery), electronics, science, architecture, cooking, language, crafts, music, engine repair, aircraft and other machine operation, inventory control, and business. For purposes of explanation herein, however, the following disclosure is related to an environment of image processing; but it should be understood that the invention, as defined by the appended claims, is meant to encompass training techniques used in all suitable fields or subject matter, in which a relatively unskilled or underskilled trainee can become an expert.

It would be advantageous to provide users with a programming language that uses their own vocabularies, phrases and concepts or those of photo-interpreters to generate rule sets that are compilable to object extraction programs in real time.

It would be doubly advantageous, if the users are novices to begin with, to allow them to become experts without knowing any computer language; and if the users are experts, their knowledge can be captured, tested, and preserved for future users.

It would also be advantageous to provide users with an intelligent graphic panel for users to generate expert system code with a few or even no keystrokes.

It would further be advantageous to provide users with an intelligent editor for users to generate complex expert system code with a few or even no keystrokes.

It would still further be advantageous to provide users with an open, flexible, and editable expert system to capture the knowledge of experts in the field.

It would also be advantageous to provide users with an open, flexible, and editable expert system for testing and modifying an existing expert system.

It would further be advantageous to provide users with a programming language and related graphic user interface (GUI) and editor sub-systems to guide users to build solution systems of object extraction, helping them to become experts.

It would still further be advantageous to provide users with means to generate object-based transformations from multispectral and hyperspectral image data to guide them in building solution algorithms in object extraction.

It would also be advantageous to provide users with a means to generate fraction planes from a hyperspectral image cube in substantially real time to guide users to develop object extraction algorithms.

It would further be advantageous to provide users with a means to estimate the confidence of an object extraction process, be it coming from a rule based system, a matching analysis, or a combination of both.

SUMMARY OF THE INVENTION

The present invention features a method of training a user to become an expert in identifying an object in an image or scene, by querying a computer system. The computer system has a lexicon of photo-interpreters. The user can formulate object extraction rules, as he or she becomes an expert in object recognition and extraction. The method consists of providing a programming language that has information supplied by at least one expert photo analyst, and has optional extraction rules that are dependent upon that information, as well as information input by the user. The programming language has a vocabulary for facilitating descriptions of objects to be identified. Graphical results of the user's queries are interactively displayed to aid in determining whether an object has been identified by the user. In a more advanced embodiment, the user can mark a feature of interest of the image and direct the computer system to generate descriptive words, phrases and rules for defining that feature of interest.

Even extremely complex object matching can be accomplished by using only real number based arithmetic and/or a so-called matching library. First, a hyperspectral image cube that has a number of spectral regions, is represented as a sum of a set of discrete data representative of each of the spectral regions. Then, a mean spectral reading value is obtained for each of the spectral regions. The mean spectral reading values are then used to build a pseudo multivariate distribution of the values. Using a Newton gravity model, the cumulative influence of substantially all of the spectral regions is computed for at least one of the spectral regions. Recognizable features are then extracted from the hyperspectral image cube. To determine how close or far one object is from another, a number of equally-weighted decisions is made, the final measure of proximity being the sum of all of the decisions. If each pixel in the image cube is compared to a calibrated spectra or a given pixel in the scene, fraction planes can be created, dependent on the percentage of match or comparison against the specified, calibrated spectra sample.

By the same principle, if an observed object is extracted from a fraction plane or any appropriate image, it can be matched by an image library that contains certain prototypical objects. The goodness-of-fit between the observed object and the closest element in the matching library is conceptualized as a confidence level. For a rule-based analysis, a confidence level of an object is assigned by the user. A combined confidence level is computed by using a fuzzy set of logic.

The present invention uses the innovative object-recognition system described in U.S. patent application Ser. No. 08/759,280 (H-350), hereby incorporated by reference. Objects are divided into two broad categories, viz., wherein an analyst can articulate, after examining the scene content, how he or she would extract an object; and, secondly, wherein an analyst cannot articulate how to discriminate an object against other competing object descriptors, after examining the scene or a set of object descriptors (e.g., a spectral signature or a boundary contour).

In the first case, where an analyst is able to articulate the extraction of the objects, the proposed solution is to employ a pseudo-human language, including, but not limited to, pseudo-English, as a programming language. The analyst can communicate with a machine system by using this pseudo-human language, and then inform the machine how he or she would extract a candidate object without having to rely on a "third-party" programmer.

In the second case, where an analyst has determined that he or she is unable to articulate the extraction of an object, the proposed solution is to use an appropriate matcher with a matching library to extract the candidate object, and then pass it over to processors employed in the first-category sphere. The matching system of the present invention is accomplished by representing an observed object as a pixel in a multispectral or a hyperspectral image cube. An image cube contains two or more spectral bands. For example, a typical LANDSAT Thematic Mapper contains seven bands, and a HYDICE image cube contains 210 bands.

Conventional methods of matching objects in a signature domain are based largely on matrix theory. Thus, a matcher is usually associated with inverting a large-size matrix. This method is very computation intensive. For example, to obtain an eigen vector from an image cube of 200 bands, each band is of dimension 512×512 pixels. It currently requires two hours, using a SUN SPARC station 2TM computer, to perform this task. But using a non-matrix theory-based method to perform the task reduces the computing to less than one minute using a Sun Ultra 10TM system (300 Mhz single processor).

Once an extracted object is passed over to the first environment, this object becomes describable by using the proposed pseudo-human language. Thus, it can be combined with other existing objects, each having a certain level of confidence, to extract still further objects. The final result, then, is the extraction of a set of complex or compound objects with a certain level of combined confidence.

Copending U.S. parent patent application Ser. No. 08/759, 280, filed by the present applicant on Dec. 2, 1996, for A LEXICON-BASED AND SCRIPT-BASED METHOD OF RECOGNIZING OBJECTS IN IMAGES, and hereby incorporated by reference, discloses a means of communication between an analyst and a computer. This human computer interface, in the form of a pseudo-human-based programming language, includes a photo-interpreter that can extract the two types of target complexes.

In addition to serving as an interface module between an analyst and a computer, this language functions in two significant ways: (1) it is a vehicle to capture and preserve the knowledge of the human analysts; and (2) it is an environment in which an analyst can organize his or her image-exploitation knowledge into computer-compilable programs. That is, it is an environment for knowledgeably engineering automatic, object-recognition processes.

A matching method is provided for recognizing objects in multispectral and hyperspectral image data. For single band data sets, a match can be performed using a library composed of two-dimensional or three-dimensional imagery elements. For multispectral and hyperspectral imagery, however, a match can be performed using a library composed of spectral signatures, each representing a specific type of material. Even extremely complex object matching can be accomplished by using only real number based arithmetic. First, a hyperspectral image cube that has a number of spectral regions is represented as a sum of a set of discrete data representative of each of the spectral regions. Then, a mean spectral reading value is obtained for each of the spectral regions. The mean spectral reading values are then used to build a pseudo multivariate distribution of the values. Using a Newton gravity model, the cumulative influence of substantially all of the spectral regions is computed for at least one of the spectral regions. Recognizable features are then extracted from the hyperspectral image cube. To determine how close or far one object is from another, a number of equally-weighted decisions is made, the final measure of proximity being the sum of all of the decisions. If each pixel in the image cube is compared to a calibrated spectra or a given pixel in the scene, fraction planes can be created, dependent on the percentage of match or comparison against the specified, calibrated spectra sample. Thus, matching is achieved by finding the closest match between an observed object and an element of the library, coupled with an associated goodness-of-fit indicator or a confidence level.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A complete understanding of the present invention may be obtained by reference to the accompanying drawings, when considered in conjunction with the subsequent detailed description, in which the same reference numbers refer to the same parts throughout the different views, and in which:

FIG. 10a is an Image Attribute Table containing values associated with attributes of images;

FIG. 11a depicts computer code generated from the photo analysis of the example chosen for illustration;

FIG. 17a depicts programming code that represents a greenness transform of the image shown in FIG. 17;

FIG. 24 depicts code representing a combination of two sample objects, each having its own initial confidence level;

FIG. 26 depicts code representing a combination of two sample objects, each having its own initial confidence level.

DETAILED DESCRIPTION OF THE PREFERRED EMBODIMENT

Figure 1:
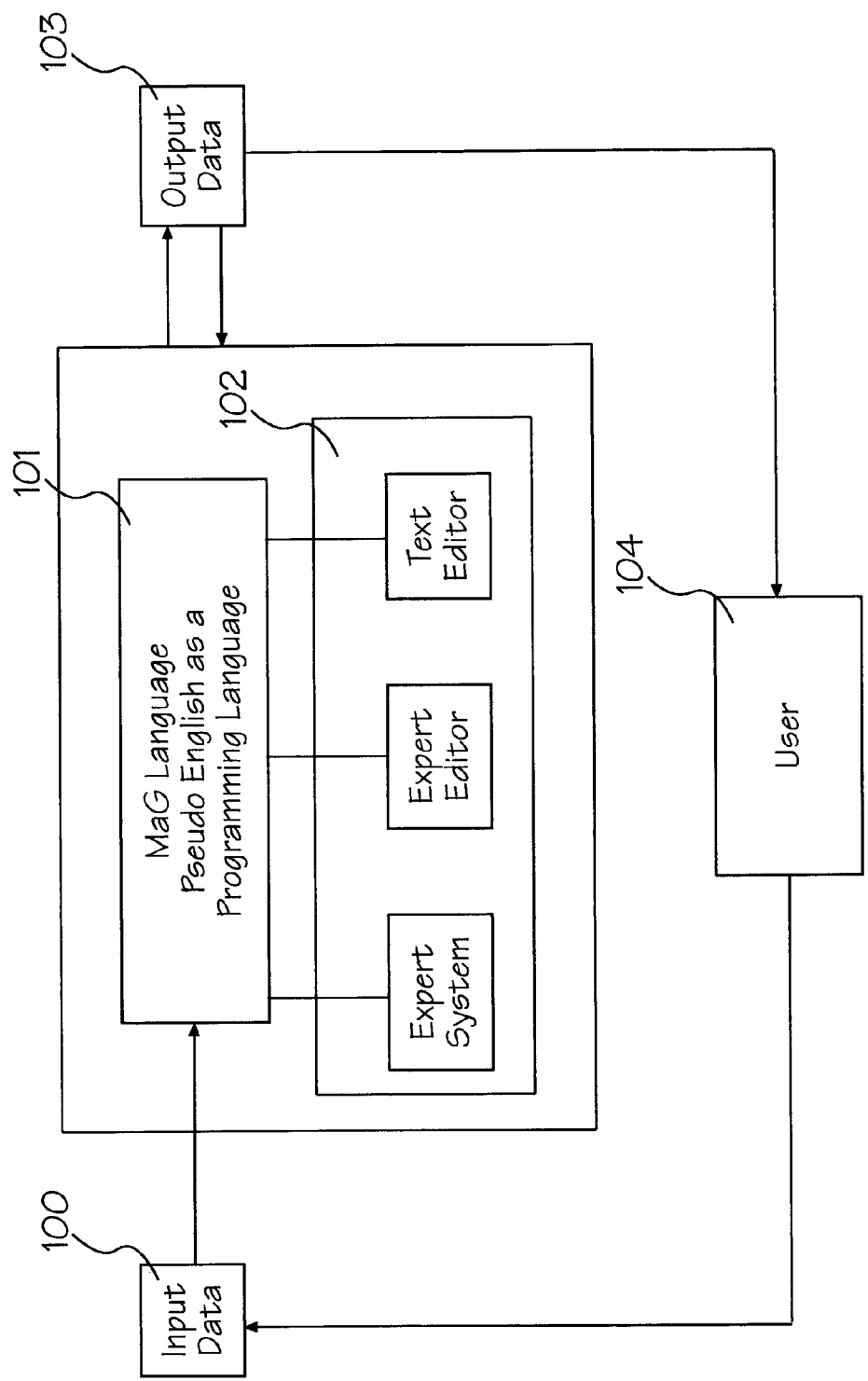
FIG. 1 is a block diagram illustrating the interactive language and method of the present invention, in which a user provides information to the system.

Generally speaking, the invention features a system, in the field of photo-interpretation, for example, in which students are taught or trained to extract an object from an image by using the Tone principle, the Texture principle, the Size principle, the Shape principle, the Shadow principle, the Pattern principle, the Associated Feature principle, and the Stereo Scopic characteristics principle. In addition, once such a training process is accomplished, the system becomes an automatic, interactive object recognition system.

The method the invention is intended to train a user to become an expert by querying a computer system. In the case herein presented for purposes of illustration, the user becomes an expert in identifying an object in an image. It should be understood, however, that many other fields of endeavor can exploit the teachings of this invention, as will be apparent to those skilled in the various and germane arts.

The computer system of the present invention has a lexicon of photo-interpreters. The user can formulate object extraction rules, as he or she becomes an expert in object recognition and extraction. The method consists of generating a database to be queried by at least one expert photo analyst. A programming language is provided to generate object extraction rules against the generated database. The programming language has a vocabulary for facilitating descriptions of objects to be identified. Graphical results of the user's queries are interactively displayed to aid in determining whether an object has been identified by the user. In a more advanced embodiment, the user can mark a feature of interest of the image and direct the computer system to generate descriptive words, phrases, rules, images and text files for defining that feature of interest. Even extremely complex object matching can be accomplished by using a spectral library that uses only real number based arithmetic and/or a 2-D or 3-D image library. First, a hyperspectral image cube that has a number of spectral regions, is represented by a set of fraction planes and texture transforms.

In terms of the fraction plane approach, to achieve real time processing, a mean spectral reading value is obtained for each of the spectral regions. The mean spectral reading values are then used to build a pseudo multivariate distribution of the values. Using a Newton gravity model, the cumulative influence of substantially all of the spectral regions is computed for at least one of the spectral regions. To determine how close or far one object is from another, a number of equally-weighted decisions is made, the final measure of proximity being the sum of all of the decisions. If each pixel in the image cube is compared to a calibrated spectra or a given pixel in the scene, fraction planes can be created, dependent on the percentage of match or comparison against the specified, calibrated spectra sample.

In terms of the texture transform approach, each ground pixel is represented by a set of spectral readings, forming a vector. By passing an (n×n) window over the image (ground) surface, the certain pixel can be represented by an average of 8 correlation coefficients computed between the certain pixel and its 8 neighbors in a (3×3) case. If every pixel on the ground is represented by such coefficients, the resultant image is a textural transform of a hyperspectral image cube. Since many hundreds of image bands have been reduced to a few texture transforms, they can be used as a means to train users to become experts in using the inventive system, making the programming language the user's language.

Referring now to FIG. 1, there is shown a block diagram illustrating the interactive language and method of the present invention. Information or data 100 is input to the lexicon of photo-interpreters 101 in the computer system. The user 104 can formulate object extraction rules, as he or she becomes an expert in object recognition and extraction. The method consists of providing a programming language 101 with information supplied by at least one expert photo analyst, not shown, and has extraction rules 101 that are dependent upon that information 100, as well as information input by the user 104. The programming language has a vocabulary and an expert system, an expert editor and/or a text editor 102 to facilitate descriptions of objects to be identified. Graphical results 103 of the user's queries are interactively displayed to aid in determining whether an object has been identified by the user.

In a more advanced embodiment, described hereinbelow, the user can mark a feature of interest of the image and direct the computer system to generate descriptive words, phrases and rules for defining that feature of interest.

Figure 2:
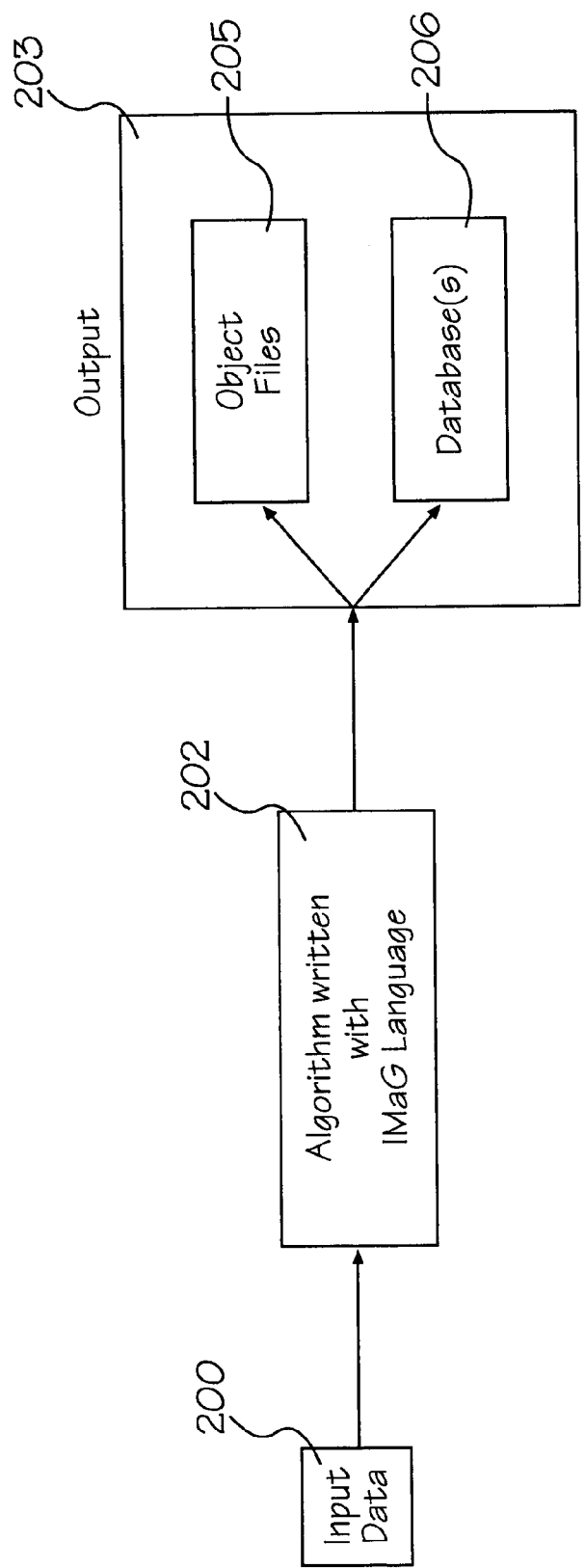
FIG. 2 is a block diagram illustrating the interactive language and method of the present invention, in which, once training is accomplished, the program executes in an automatic mode.

Once the training stage is accomplished, this system can perform data analysis in a totally automated mode, as shown in FIG. 2. In this automatic operating embodiment, information or data 200 is again applied to the program 202, which automatically generates results 203 in the form of object files 205 and/or databases 206, for future use. No user is involved, so interactivity is not required.

A matching method helps recognize objects in a single band or in a multispectral or hyperspectral image cube. A hyperspectral image cube that has a number of spectral regions, each forming a single-band image, is represented as a sum of a set of discrete data representative of each of the spectral regions. Once a mean spectral reading value is obtained for each of the spectral regions, the mean spectral reading values are used to build a pseudo multivariate distribution of the values. To determine how close or far one object is from another, a number of equally-weighted decisions is made, the final measure of proximity being the sum of all of the decisions.

As to single-band imagery, extracting terrain features with radar imagery has been performed for more than thirty years by using the human visual system. In general, an analyst would know that a cultivated field generates weak synthetic aperture radar (SAR) returns, whereas a conifer forest would generate strong SAR returns. In terms of photo-interpretation terminologies, these two patterns correspond to fine-texture and coarse-texture regions, respectively. Thus, an analyst would most likely determine that he or she can articulate how a cultivated field can be extracted, e.g., based on "low tone and low texture" descriptors. Accordingly, the analyst would most likely use a rule-based approach to perform this feature-extraction task.

Education is a process and a means by which a person learns how to solve a problem. In the field of photo-interpretation, students are taught to extract an object by using the following specific principles:

1) the Tone principle, 2) the Texture principle, 3) the Size principle, 4) the Shape principle, 5) the Shadow principle, 6) the Pattern principle, 7) Associated Feature principle, and 8) the Stereo Scopic characteristics principle.  (1)

For example, in a panchromatic image, the Tone of a body of water is very dark, whereas the Tone of a cement road is very bright. A river has an elongated Shape, whereas a pond is usually not elongated. A flying airplane is associated with sky, whereas a non-flying airplane is associated with an airfield. These are only a few examples of using particular vocabularies and concepts to perform object extraction by using the human visual system.

In visual photo-interpretation, the analyst uses these particular vocabularies and interpretation principles to derive a meaningful conclusion, such as, "This is a river, and that is a helicopter." In visual photo-interpretation, the analyst, who might also be a radiologist, for example, learns how to extract an object from his or her teachers, and can gain knowledge from experience and learning from colleagues. This learning process takes place through the use of a language that is properly used to communicate among analysts and through literature.

As discussed above, using conventional means in a hardware, software and algorithm interaction environment, a user presently cannot actively participate in the problem solving process, simply because there is no programming language that is based on these photo-interpretation vocabularies and syntax. In contrast, the current invention –B a programming language based on the lexicon of photo-interpreters B– allows users to be guided by the programming language itself to develop solution algorithms. In other words, synergism can occur when the user sees or interacts with this language and its associated subsystems:

(1) editors, or (2) expert systems, or (3) intelligent
editors, or (4) a combination of the above. (2)

Described hereinbelow is a set of examples to demonstrate the contagious effect of this user-oriented and user-based programming language.

Photo-interpreters are taught to extract an object because it is bright or dark or gray. This existing user model is a prerequisite to generating synergism between the user and the programming language, based on the lexicon of photo-interpreters.

The goal of the user is to develop an algorithm to extract an object based on his or her existing object extraction model. The question is, where can the user find this matchable hardware/software environment? The present invention provides the answer, as illustrated below.

Figure 3:
FIG. 3 is a typical scene containing a plurality of objects, at least one of which is to be extracted and identified.

For example, the user desires to extract generic bright objects from a typical scene chosen for illustrative purposes and shown in FIG. 3. The bright object may include one or more of the following:

1. Circular water tanks;
2. Roofs of buildings; and/or
3. Plowed fields.

Figure 4:
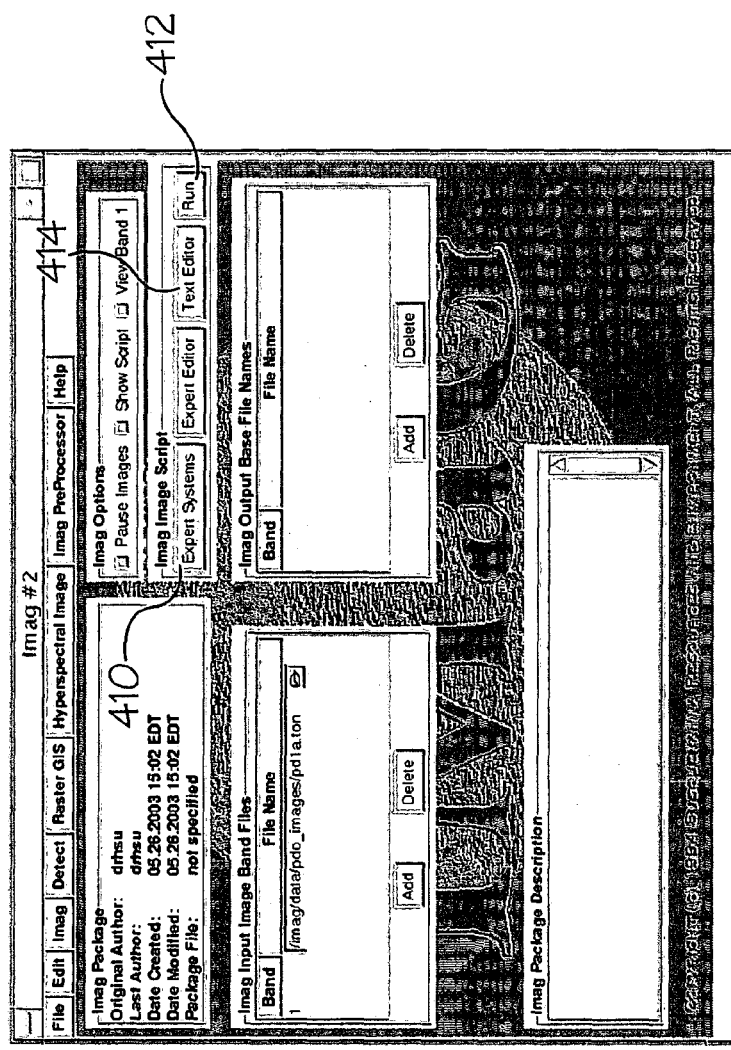
FIG. 4 depicts a main menu display, including an expert systems sub-window, used in accordance with the invention.
Figure 5:
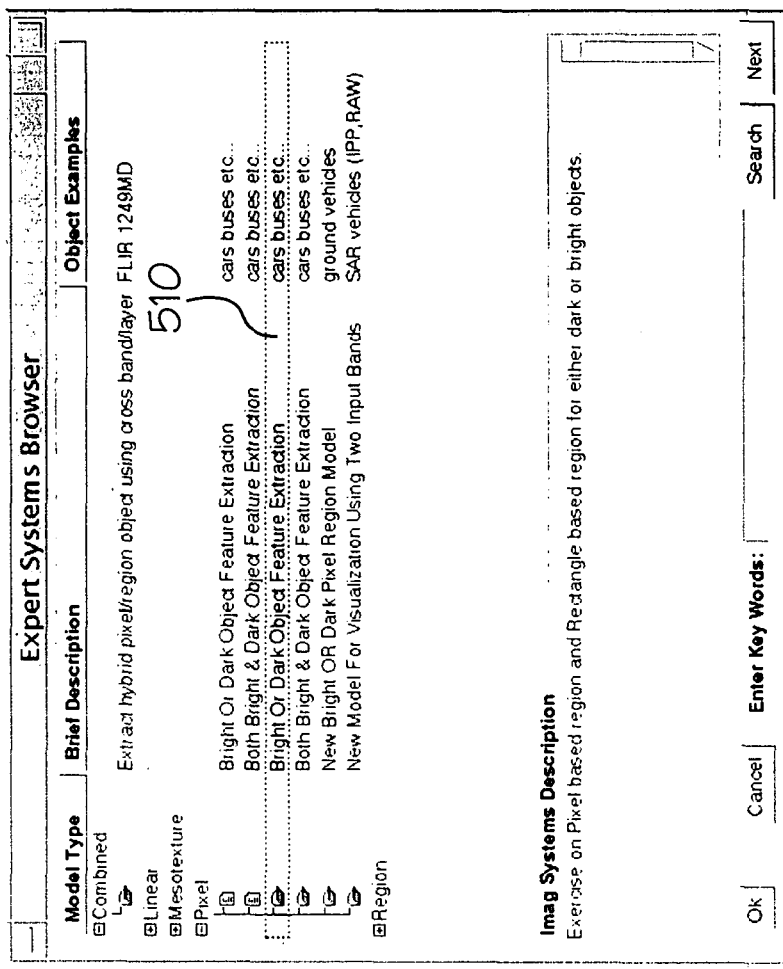
FIG. 5 depicts an Expert Systems Browser that presents a choice of user models.

In an 8-bit image, the brightness levels range from 0 (dark) to 255 (brightest). Therefore, it will be advantageous to expand this image to a full range of 0 to 255. The next question is: where can the user find a means to perform this task? To solve this problem, the user first accesses a main menu display that is depicted in FIG. 4. The main menu includes sub-windows entitled Expert Systems 410, Text Editor 414 and Run 412, among others not relevant to this discussion. Once the Expert Systems sub-window 410 is opened, an Expert System Browser displays a choice of several user models is presented, as depicted in FIG. 5. One of the user models is called:

Bright or Dark Object Feature Extraction 510 (3)

Figure 6:
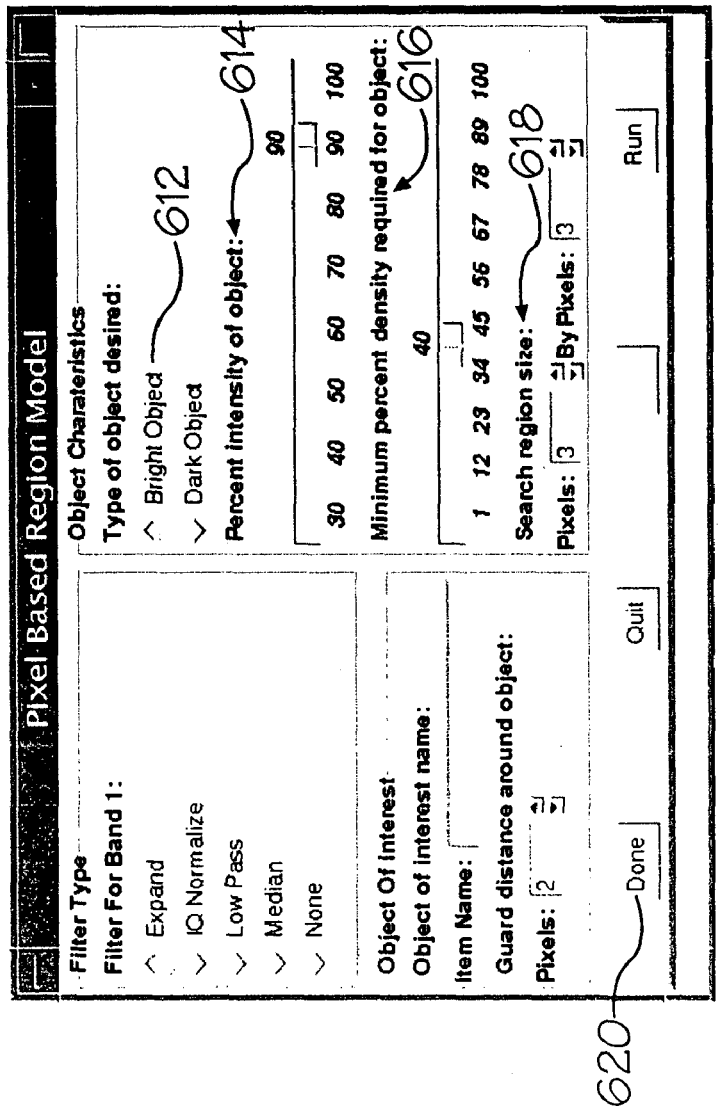
FIG. 6 depicts a Pixel Based Region Model display.

This model 510 can be opened, revealing the Pixel Based Region Model display shown in FIG. 6. The following two options are then presented or selection:

Expand 610 and Bright Object 612 (4)

The user is also given three more parameters to define bright objects:

Percent intensity of object B a sliding bar identified
by reference numeral 614; Minimum percent
density required for object –B a density based
constraint 616; and Search region size 618—B
e.g., 3×3, 5×5, etc. (5)

To assess how much a user can learn from the above-discussed object extraction model, both the original user model and its inventive counterpart are listed in Table 2.

TABLE 2

A Comparison Between Two Bright Object Extraction Models

| Model Features | Original User Model | Inventive System Model |
| --- | --- | --- |
| Expand to full 8 bits | Yes | Yes |
| Bright defined by a range | Yes | Yes |
| Bright defined further by a density | No | Yes |
| Density be defined by user-specified window size | No | Yes |

From this comparison in Table 2, it can be readily concluded that the user will learn from the inventive model specifically regarding the fact that a bright object can have a center at which the density of bright pixels will be higher than at its periphery, where the bright meets its immediate background.

Figure 7:
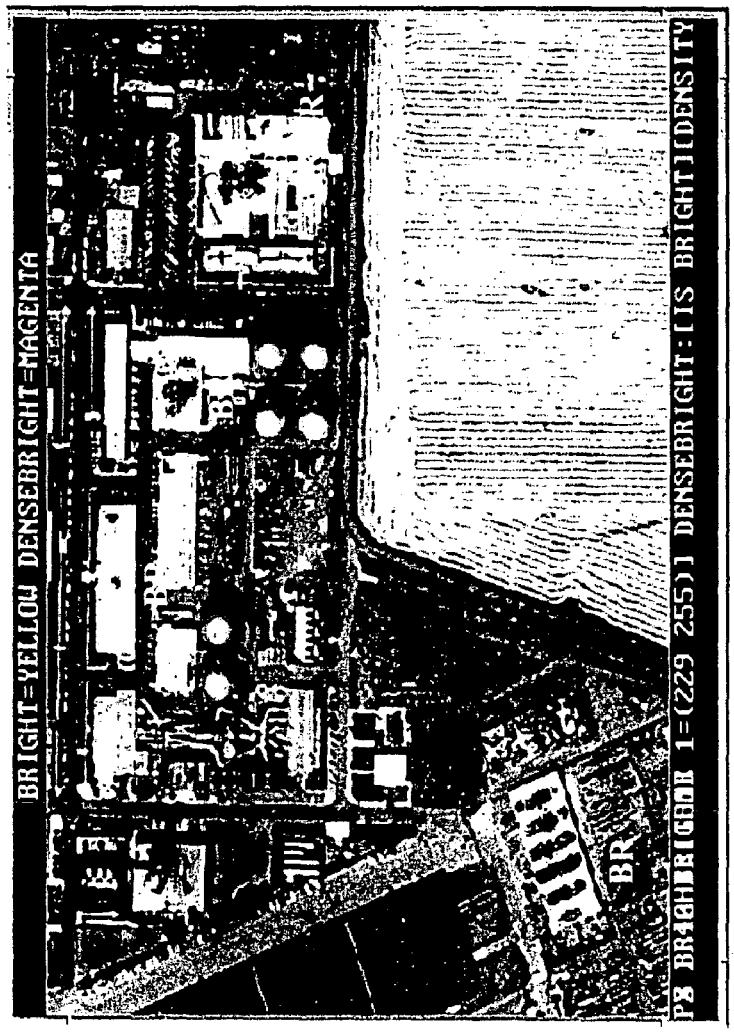
FIG. 7 depicts a decision map that includes six bright water tanks of interest.

Consider using parameters specified in the inventive system, shown in FIG. 6, to construct a solution algorithm. The Done button 620 can be clicked and the program run. The resulting decision map is shown in FIG. 7, indicating that the intended six bright water tanks (unannotated in FIG. 7 with the letters, BR) do not meet the specified criteria.

Figure 8:
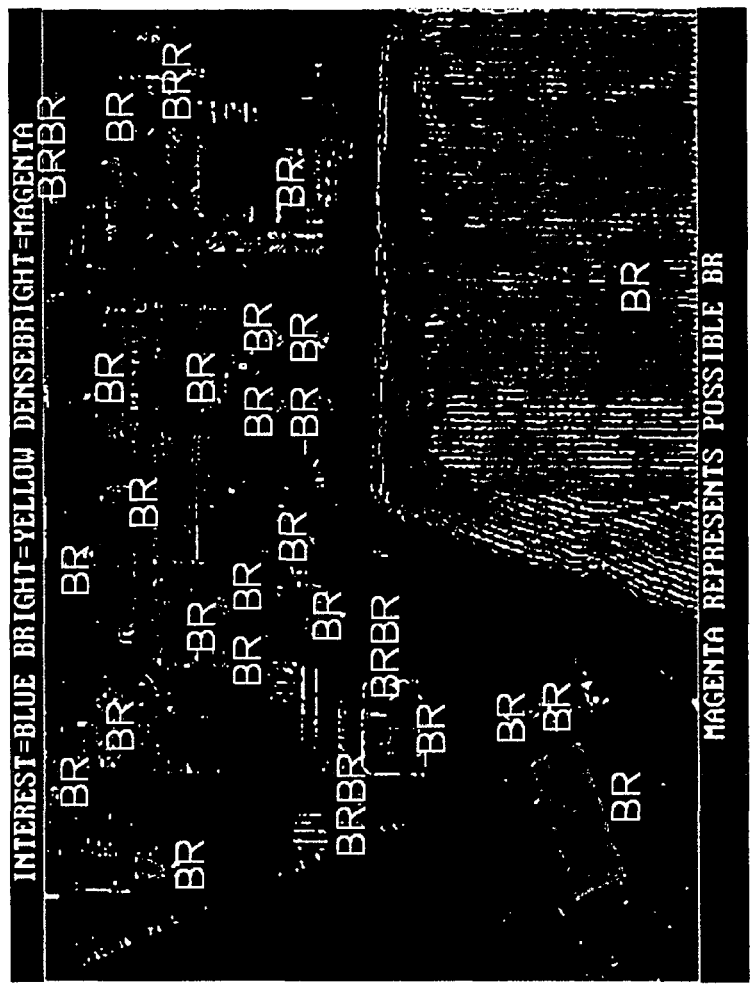
FIG. 8 depicts an image that includes the results of selecting brightness criteria, and including all six water tanks in the domain of bright object.

In the next iteration, the brightness criterion is moved from the upper 90th percentile to the upper 80th percentile of data, and then the program is executed again. The result is shown in FIG. 8, which indicates that all six water tanks are included in the domain of bright object –B locations where a high-density of bright pixels exist.

The user can learn from these test results that the intended circular water tanks cannot be extracted and differentiated from other bright objects by using one criterion, Tone, alone.

In reality, the Tone model provides only a partial solution. At this point, the user has been taught to use Size, Shape and Shadow principles to extract a vertical object, such as a water or oil tank. For this, the possible solution algorithm is switched from a pixel based Bright Object to a Shape based model called Linear, as shown in the Region Based Model display depicted in FIG. 9. Specifically, the upper right section of the display 910 is devoted to a non-linear object.

Photo-interpreters are also taught how to use Size and Shape based features, in addition to a Tone criterion, to extract an object. Following the above discussion on extracting possible water tanks, a photo-interpreter will most likely suggest that Size and Shape are very good criteria for extracting this candidate feature because:

1) a water tank is not large; and 2) its shape is close
to a circle, and extremely non-linear. (6)

Within the existing expert systems, a model is devoted to Size and Linearity, which is one of the many Shape measures. A circular Shape can be approximated by a very low measure of Linearity, such as 0 to less than 3000 in a 0 to 10000 scale.

Size can be estimated according to the resolution of the given image. Another option is to obtain a measurement by means of hand segmentation.

Figure 10:
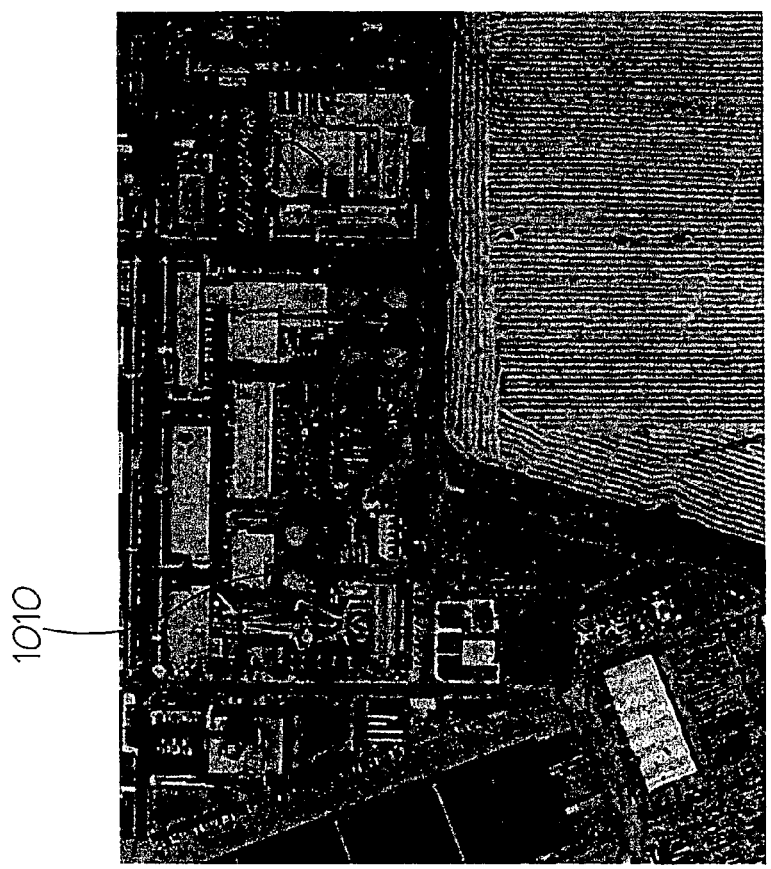
FIG. 10 shows an image in which a feature is painted or marked.

Without empirical data, it is difficult to develop an appropriate Size-and-Shape based object extraction. Under the system of the present invention, one can mark or "paint" a candidate object, and then request the system to generate a set of measurements of the painted object. With such an empirical feature set, a realistic object extraction model can be developed, as shown in FIG. 10, without guessing about the Size and Shape measurements of an candidate object. This is another way that the user can learn from inventive system. The resultant object extraction model is therefore the result of synergism between the user and the machine/software system, in the course of practicing the interactive method described with respect to FIG. 1.

Consider the following experiment, while referring to FIGS. 10 and 10a. FIG. 10a depicts a graphical representation of values associated with object attributes. First, one of the possible water tanks 1010 (FIG. 10) is painted with a Tone value 255 using the XV viewer, not shown, associated with a UNIX system. To generate feature measurement data, the <users/drhsu/PAINTER> directory is accessed and a program is executed called, $$\text{Process Name-of-original-image name-of-painted-image} \tag{7}$$

Figure 11:
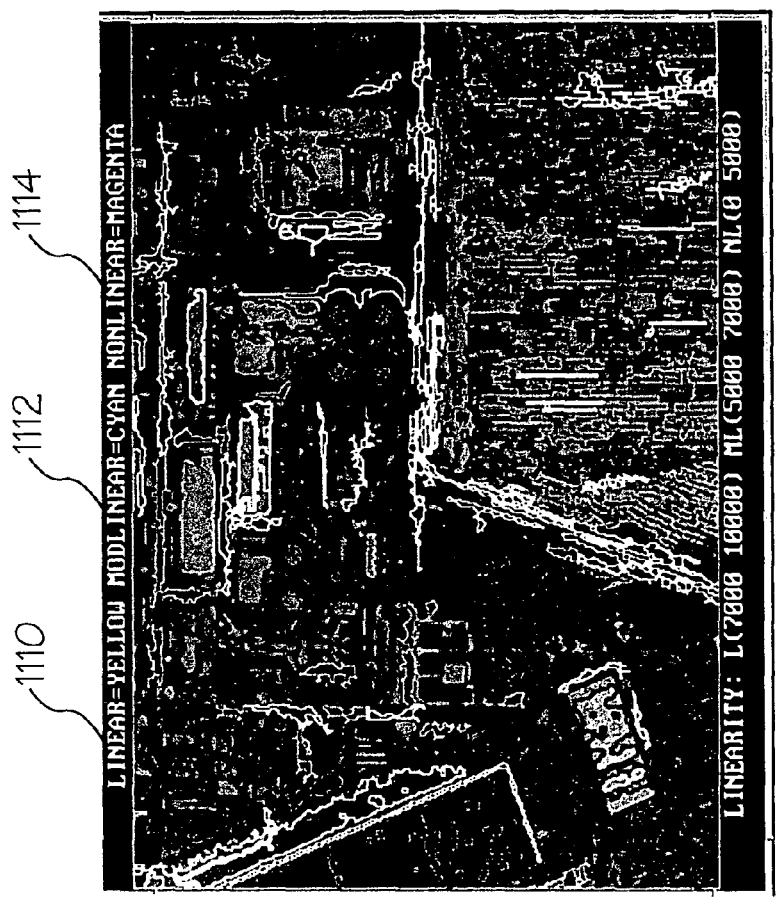
FIG. 11 is an image depicting degrees or categories of Linearity.

The result is depicted in FIG. 11, which shows that the image contains three regions. The region 1010 (FIG. 10) that has a Tone value of 255 (the painted object) has a Size of 87 pixels 10a10 and a Linearity measure of 360, shown as reference numeral 10a12 in FIG. 10a. Linearity measurements fall into three categories: Linear 1110 (FIG. 11), from a value of 7000 to 10000; Modlinear 1112, from a value of 5000 to 7000; and Nonlinear 1114, from a value of 0 to 1000.

To extract the painted object in this example, the appropriate Size value should be between 50 to 100, and the Linearity measurement should be less than 1000. In this case, the system generates a segmentation map that is close to its counterpart, by using hand segmentation.

Referring now to FIG. 11a, the code resulting from the foregoing analysis is shown.

Figure 12:
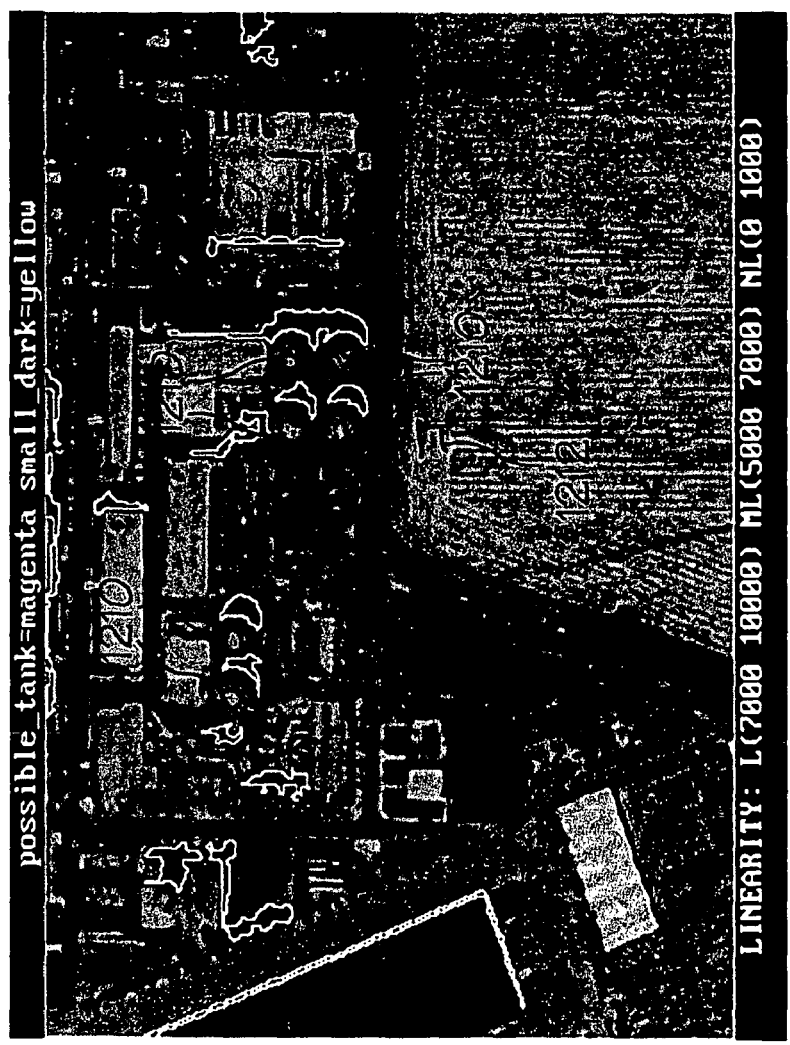
FIG. 12 is a photo image in which all possible water tanks in a given Size range are extracted, and which includes false positives.

The result of this experiment is shown in FIG. 12, indicating that all of the possible water tanks 1210 in the given Size range were extracted, as annotated or marked in red in FIG. 12. However, certain false positives or false alarms 1212 are included with these target objects 1210.

By interacting with the decision of the system (specifically FIG. 12), the user will immediately realize that, to reject the false alarms, he or she must use additional object features to construct a more effective rule set. In this case, Tone and associated features are very good candidates in view of the facts that:

1) The possible water tanks are relatively very bright, as shown hereinabove; and 2) A water tank is a vertical object, associated with a feature called Shadow.

In the photo-interpretation literature, the phrase, associated features is only a concept. To make it operational, the user must:

a) define a new object that can be associated with the existing object; and b) select one of the given spatial analysis functions (vocabularies) to link the newly-defined object with the new object.

The allowable spatial functions/vocabularies of the system include the options shown in Table 3.

TABLE 3

Spatial Analysis Vocabularies To Generate Associated Features a. Abovenot–above
b. Belownot–below
c. Leftnot–left
d. Rightnot–right
e. Within xnot–within x [pixels]
f. Adjacentnot–adjacent
g. Approaches ynot–approaches y [pixels]
h. Touchesnot–touches
i. Surroundsnot–surrounds
j. Surroundednot–surrounded In addition to the above simple spatial relationships, compound spatial functions are usually allowed, such as the case of the number 19, shown in Table 4.

TABLE 4

Example of Complex Spatial Relationship: Number 19

$$\begin{array}{l}\text{Seek one1 nine9 nineteen19;}\\ \text{Region one1 is already defined}\\ \text{Region nine9 is already defined}\\ \text{Region nine19: [is one]}\\ \quad\text{[left nine9]}\\ \quad\text{[within30 nine9];}\end{array} \tag{8}$$

Now returning to the original subject—extracting six possible water tanks, the Tone and associate feature principles are used to formulate a more effective rule set. For this, the user switches from a GUI panel to a text editor, as a follow up rule base construction process.

Figure 9:
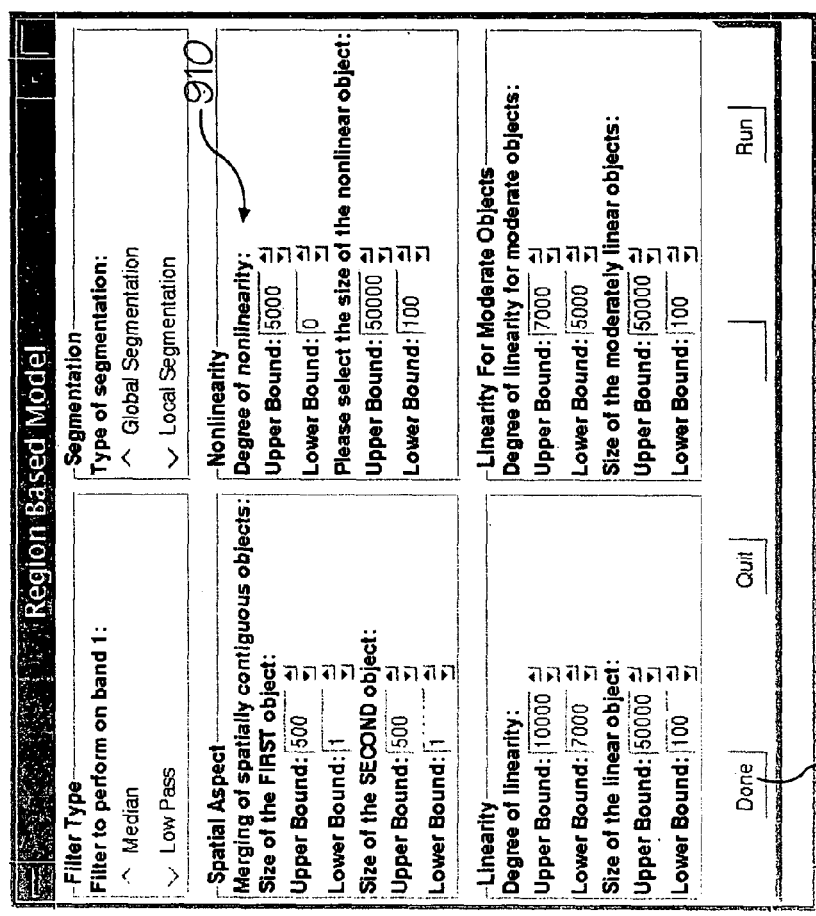
FIG. 9 depicts a Region Based Model display.

Recall that the rule set that generated the decision map, such as that shown in FIG. 9, was obtained by using a GUI panel. At this particular GUI panel, the user clicks on the Done button 912, and the system returns to its main GUI panel or display (FIG. 4). If the user clicks on the Run button 412 (FIG. 4), the system will generate the FIG. 12 decision map. Instead of Run 412, the user clicks on Text Editor 414 to view and possibly modify an existing rule set. In order to add two additional features to an existing rule that generated FIG. 12, the text file is modified or edited, as shown in Table 5.

TABLE 5

Adding Additional Features to Rule Set of FIG. 12

1. Adding modify 1 = expand;
   /* to expand tone range to a full 0 to 255 scale */
2. Raise initial cutoff = 1 to initial cutoff = 5;
   /* since this a now full 2–255 scene */
3. Add three new features by adding:
   Seek small_dark_region   nonlinear_bright   possible_tank;
4. Define these new objects, as shown in FIG. 11a.
   For the target object:
   Region Possible_tank : [is nonlinear_bright]
                [approaches 30 small_dark_region];
5. Display the final target object. (6)

The result is shown corresponding to decision map, FIG. 12, which indicates that all six possible water tanks 1210 are extracted, coupled with only one false alarm 1212.

From the foregoing discussion, it can be realized that a user-based model begins with a simple Tone or Size based object extraction rule set. By working with the inventive system B– its language, its GUI, its decision maps, its text editor, etc.—the user begins to modify his or her object extraction models by including additional object extraction rules, such as Shape and associated feature rules. In the end, the user model becomes very sophisticated, yielding improved performance in object extraction (i.e., a higher hit rate with a lower false alarm rate). It can be seen that a user can improve his or her skill regardless of his or her original skill level. In other words, even an experienced user can benefit from the expert information disposed in the system library and accessible by the user.

A user based object extraction usually begins with a concept without an operational definition. The principle of associated features is a case in point. By the time a final rule set is tested and verified, this associated feature principle has a set of operational definitions, not merely a concept.

This synergistic phenomenon can be elaborated by using a concrete example. In FIG. 12, one false alarm 1212 appears. Its corresponding rule set is:

Region Possible_tank:[is nonlinear_bright] [approaches 30 small_dark_region]; (9)

In this model, the spatial association is established in terms of 30 pixels at the closest points. This 30 pixel distance can be treated as a working hypothesis. The inventive system is an environment for the user to test his or her hypothesis. For example, a new hypothesis can be set by changing the number 30 to a new number 15 as follows:

Region Possible_tank:[is nonlinear_bright] [approaches 15 small_dark_region]; (10)

This is done by using the Text Editor mode. The hypothesis is then tested against the same scene; the results are show in FIG. 13. Since FIG. 13 contains only the six possible water tanks 1310 as the target object, without any false alarm, the user can conclude that this 15-pixel distance between a water tank 1310 and its corresponding shadow 1312 is a much better model than the previous one. Indeed, Equation (10) becomes a user model for extracting a possible water tank when it has a shadow.

Therefore, the knowledge gained from the process of transitioning a mere conceptual model of the associated feature principle to an operation of Equation (10) is a result of a cognitive process of learning by the user, while he or she interacts with the inventive system. This is precisely the feature that the historical and existing computer languages lack.

Figure 14:
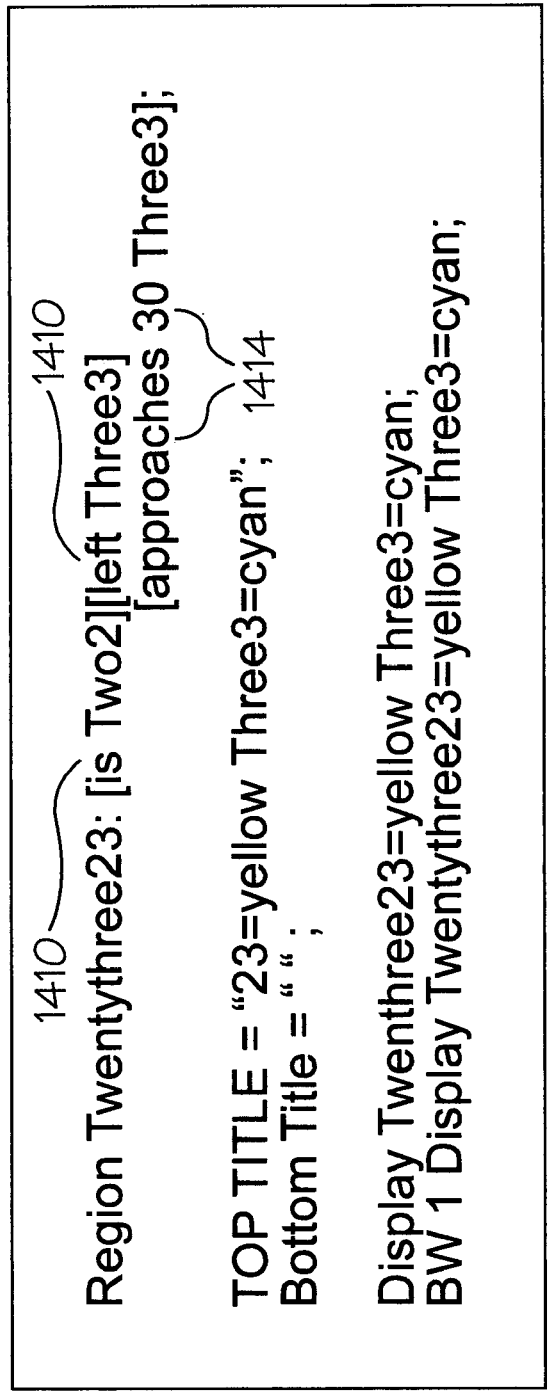
FIG. 14 depicts computer code including a partial rule set for specifying the digits "2" and "3", representing "23"

Referring now to FIG. 14, to recognize a two-digit number, a user will most likely specify that number (e.g., 23) can be recognized by using these rules:

1. There are two one digit numbers: 2 and 3. 2. Two is located to the left of three. 3. The two numbers are very close to each other spatially. (11)

Figure 15:
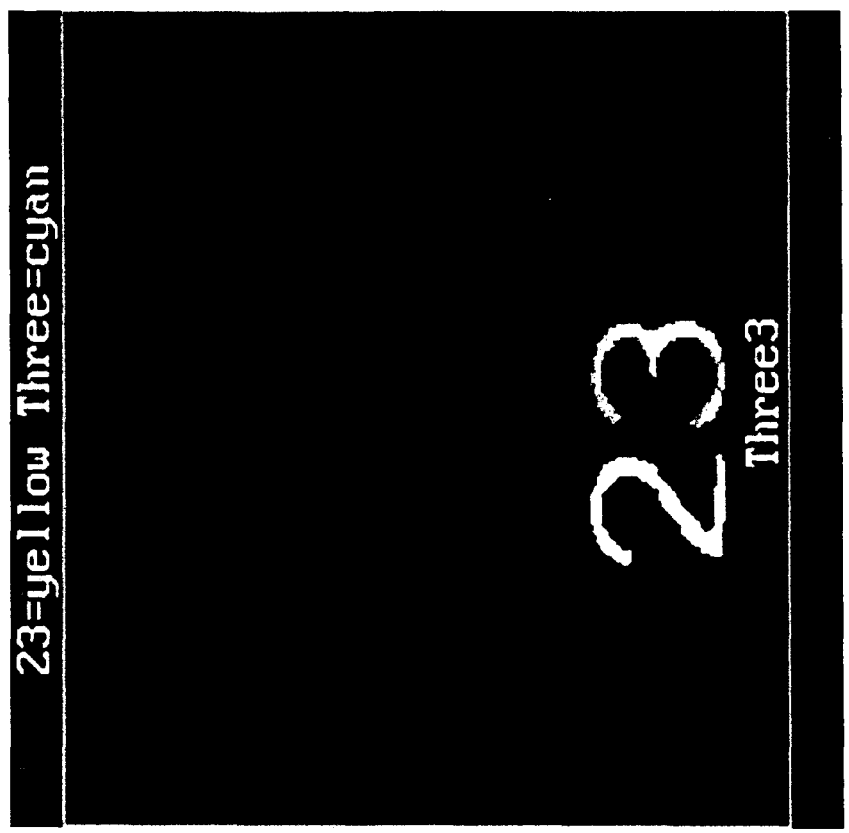
FIG. 15 is a decision map reflecting the image positions of the digits "2" and "3", representing "23"

In the above section, a complex spatial relationship is defined in terms of the use of multiple spatial analysis functions. The object is defined as illustrated in Table 4 or Equation (5), in which the number 19 was used an example. A partial listing of this rule set is shown in FIG. 14. Its corresponding decision map is illustrated in FIG. 15. In this case, the specific spatial analysis vocabularies are:

is 1410, left 1412, and approaches 30 (shown as reference numeral 1414 in FIG. 14). (12)

By comparing the contents of Equations (11) and (12), the user can conclude that there is little difference between these two models, particularly when one equates very close to 30 pixels apart.

Two additional experiments were conducted by the present inventor to determine the meaning of "very close." In the first experiment, the term "approaches 30" was replaced with "within 60." The result shows that the number 23 is correctly identified.

In the second experiment, the term "approaches 30" was replaced with "adjacent." The result indicates that the number 23 cannot be recognized. For the word "adjacent" to be understood by the system, the two circumscribing rectangles must overlap. Since, in this case of the number 23, these two numbers are vertical, their circumscribing rectangles will not overlap.

What Can the User Learn from These Experiments?

We have conducted four experiments on recognizing a two-digit number 23 using various spatial analysis functions and vocabularies. The results are:

1. "Approaches 30" works 2. "Within 30" does not work 3. "Within 60" works 4. "Adjacent" does not work (13)

From the data in Equation (13), the user can conclude that the distance between the center of 2 and the center of 3 is greater than 30 but less than 60, and that the characters are vertical rather than italicized (slanted).

From this experience in testing varying object recognition models, the user will learn from inventive system how to differentiate a vertical case from italicized lettering. This is another case of the user/inventive system synergism phenomenon.

Thus far, what has been shown is how users can learn from the inventive system to improve their object recognition ability, based on analysis of single layer images. Now, what is described is how the same user/inventive system synergism occurs when input data are multiple image layers.

First, there is illustrated how a user can acquire information from system outputs and then can use appropriate vocabularies to construct object extraction rules. The input data are LANDSAT Thematic Mapper data of Washington, D.C. The target object is the Pentagon. More precisely, the question is, can a user learn from the system how to extract the Pentagon? (14)

Figure 16:
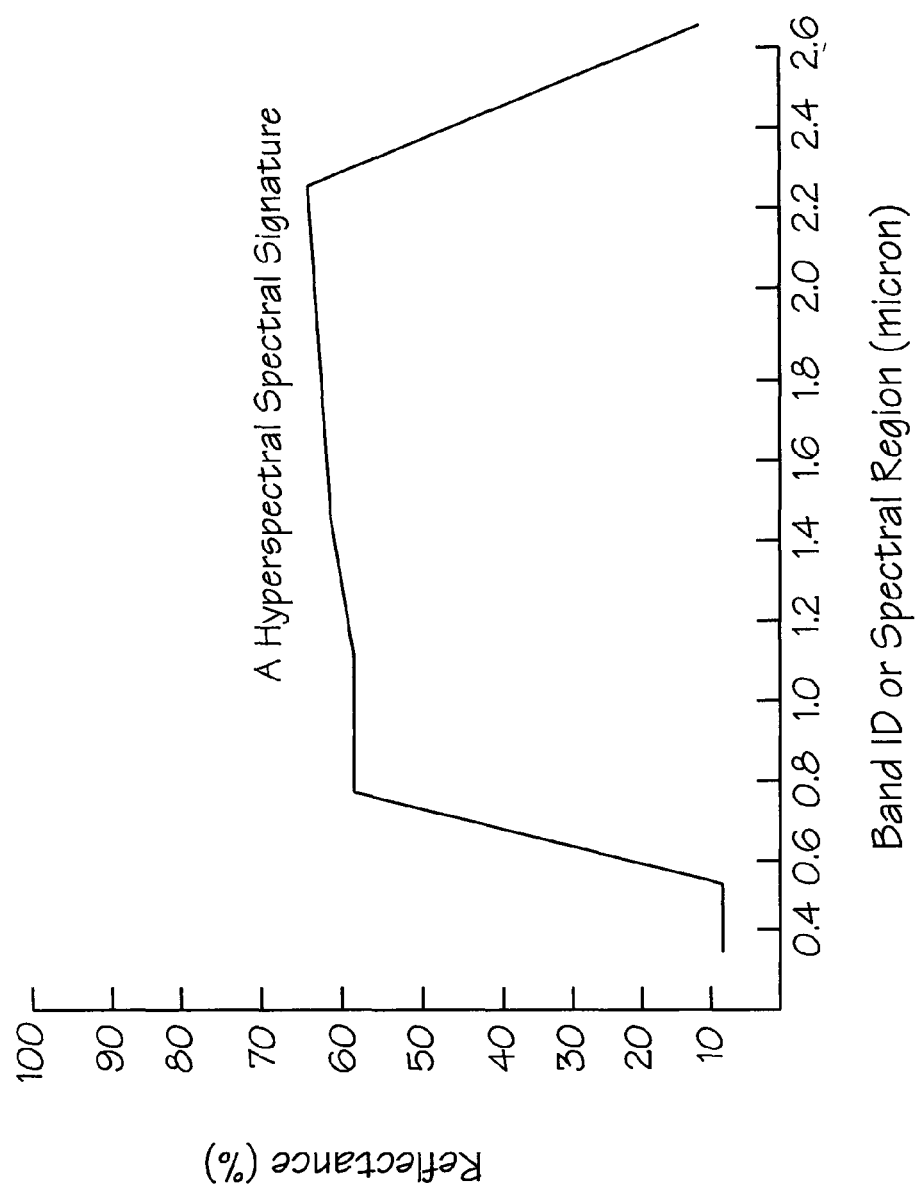
FIG. 16 is a graph depicting the spectral representation (spectral region vs. reflectance) of one pixel.

In this case, assume that the user does not have a pre-set object extraction model. Conventional multispectral or hyperspectral image data consists of multiple bands, each being imaged from a specific, narrow interval of a spectral region. Therefore, each layer is a spectral representation of the objects within the field of view (FOV). From the viewpoint of one pixel, the sum of this spectral representation is essentially a curve or a wave form in 2-D space, the vertical axis of which is a percent of reflectance (or radiance amount). The horizontal axis is the spectral region, as shown in FIG. 16, depicting the spectral representation of one pixel.

To help users learn how to extract objects, the system generates a set of low-fidelity, object based information layers. The term "low fidelity" means not very precise, but very generalizable over time and across space. For example, the concept of greenness can include trees, grass, lawn, cultivated fields and so on. Therefore, an object based on a greenness transform is not very precise, but this greenness-based result is applicable to various seasons in various parts of the world.

Another multispectral data-based, low-fidelity object layer is a water model based transform. Again, water can include a river, a pond, an ocean, and so on. Therefore, the object based on a water transform is not precise, but it is almost universal over time and across space.

By using a thermal band, an object can be defined as a hot object or a cold object, using a loosely defined class-interval system, such as "greater than 50th percentile is hot," and "from zero to 30 is cold," and so on.

By the same token, the user can ask the system to output a set of decision maps, each based on Tone, Size, Shape and/or texture object features, as shown in Table 6. These objects are called generic objects, as opposed to task specific objects, and are defined in the inventor's U.S. Pat. No. 5,631,970, hereby incorporated by reference.

Table 6. Feature Attributes for Generating
Low-Fidelity Object Layers

1. Graytone intensity (Tone, Mintone, Maxtone) 1. Texture measures (Texture, Deviation, Diversity) 2. Number of Pixels in A Region (Size) 3. Shape measure 1 (Convolution) 4. Shape measure 2 (Elongation) 5. Shape measure 3 (Constriction) 6. Shape measure 4 (Linearity) 7. Shape measure 5 (Aspect) 8. Orientation (Inclination) (15)

These features can be applied to the original input bands and transformed bands. Therefore, the system can guide a user as to how to extract a specific object by presenting these generic and/or low-fidelity object-based information layers.

The process of learning how to construct an object extraction rule begins with visually overlaying one information layer on top of the other. The following example, extracting the Pentagon, illustrates this phenomenon.

Figure 17:
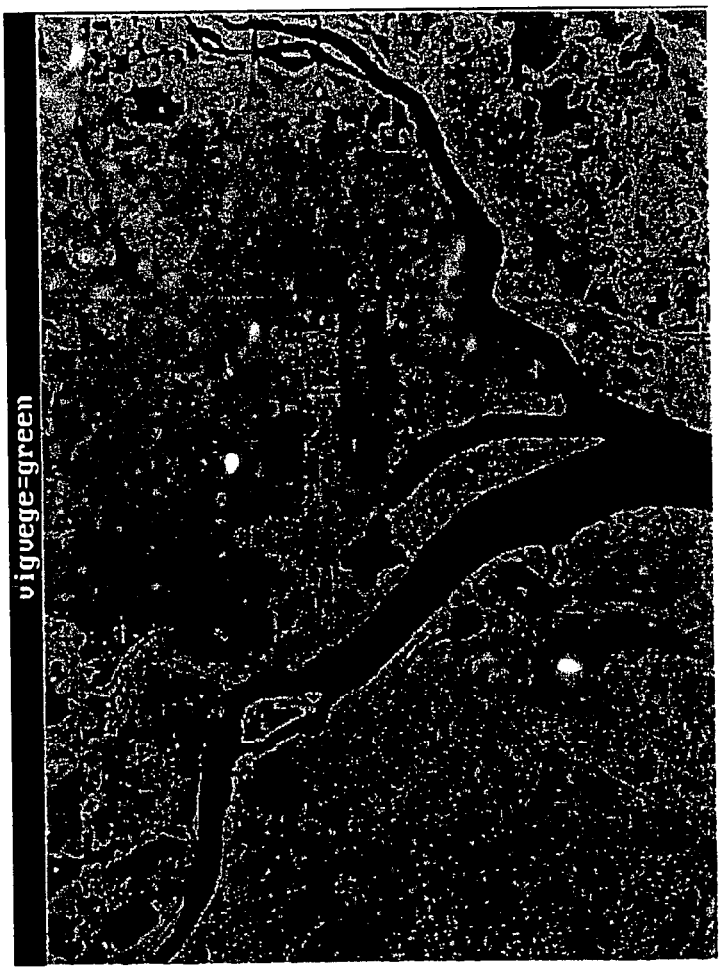
FIG. 17 is an image that linearly combines LANDSAT™ bands 1, 2, 3, 4, 5 and 7.

Referring now to FIGS. 17 and 17a, there are shown a linear combination of LANDSAT™ bands 1, 2, 3, 4, 5 and 7 (FIG. 17) and the computer code representation of a greenness transform for band 8 and band 9, shown as reference numerals 17a10 and 17a12, respectively, in FIG. 17a, which relates to the image of FIG. 17. Corresponding object layers can be a layer of green and another layer of non-green objects. The differentiation between these two types of objects is established by using an appropriate breaking point value. For example, for a mid-latitude LANDSAT image, the cutoff point can be 11, for example, yielding the following object extraction rules:

Seek green_object non_green_object; Region
    green_object: [#0 tone 8=(11 255)]; Region
    non_green_object: [#0 tone 8=(0 10)]     (16)

By extending the above model to include a Size principle, the user can define an object as:

Seek Small_green_object; Region Small_green_object: [is green_object] [#0 size 8=(11 50)];     (17)

LANDSAT Band 6 is a thermal band 17a12, which can be expanded to a full 8-bit range. Then, a hot_object can be defined as having a Tone range between 140 and 255, as shown in FIG. 18 and below:

Seek Hot_object; Region Hot_object: [#0 tone
    6=(140 255)];     (18)

Figure 18:
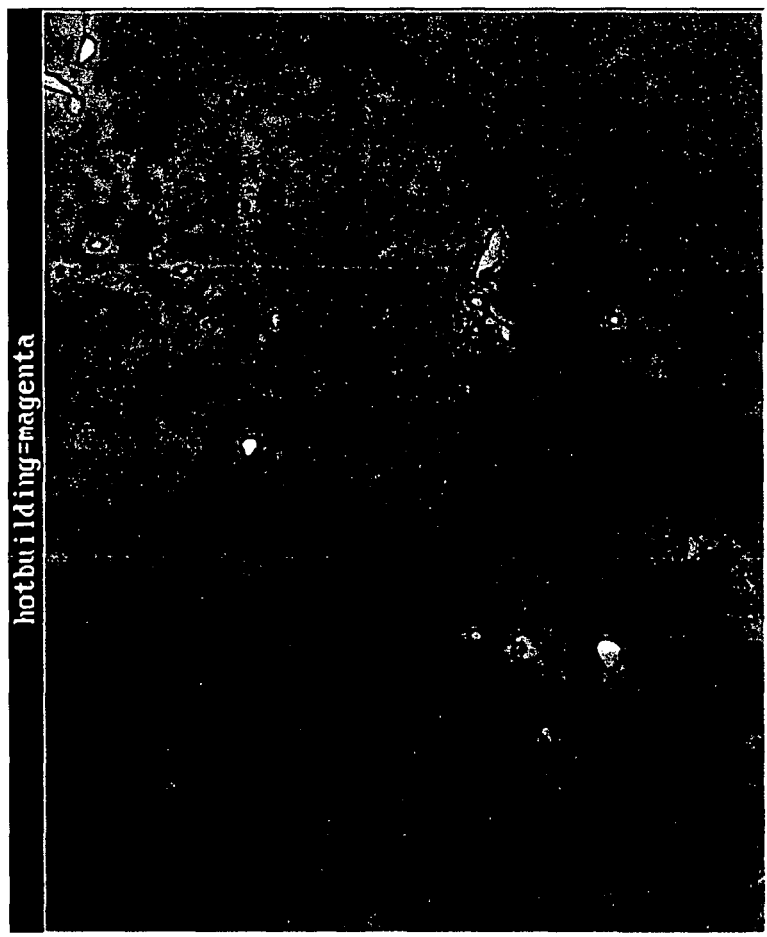
FIG. 18 is a decision map that includes a hot object having a Tone range between 140 and 255.
Figure 19:
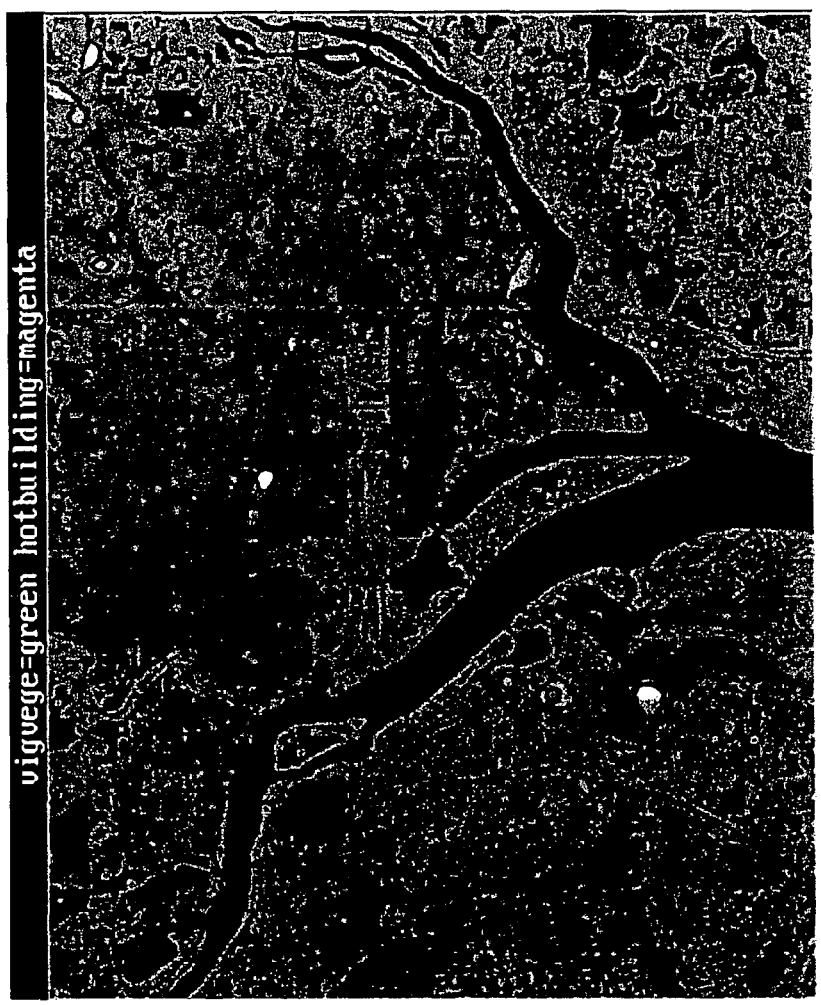
FIG. 19 is an image that results from merging the greenness based objects of FIG. 17 with the hot object based decision map of FIG. 18.

In the foregoing discussion, greenness based objects were shown in FIG. 17, and a hot_object based decision map was shown in FIG. 18. Merging these two objects together results in FIG. 19. The means for this object overlay for visual analysis is displaying two objects in one display statement as follows:

bw 1 display Green_object=green
    Hot_object=magenta     (19)

Figure 20:
FIG. 20 is an image of the United States Pentagon.

To obtain some insight into how to extract the Pentagon as a unique object in the scene, the user can zoom in to the Pentagon area, shown in FIG. 20. A small-size green_object 2012 is inside the hot_object 2014 at the Pentagon area. The Size of the hot_object 2014 is close to a pentagon shape. A Size of about 100 to 500 pixels can be assigned to (or even "painted" over) the pentagon Shape. The Size of the small green_object 2012 can be estimated as 10 to 50 pixels.

The key question here is how to establish the relationships between the small green_object 2012 and the pentagon-shaped hot_object 2014. Visually speaking, they can be related as shown in Table 7.

Table 7. Possible Spatial Relationships

1. Green touches magenta;
2. Green within x of magenta;
3. Magenta is outside green;
4. Green is inside magenta;
5. Magenta surrounds green;
6. Green surrounded [by] magenta;
7. Green adjacent magenta;
9. Green approaches y magenta;
10. Other types of relationships are possible, such as the combination of outside and within x.

By experimenting with the options listed in Table 7, the user will learn from the system the specific object extraction means and information shown in Table 8.

Table 8. Possible Object Extraction Means to be Learned

1. How to establish correct spatial relationships when:
    a) Two objects do not touch
    b) Two objects do not touch, but close within a given distance
    c) Two objects touch, but one is not completely surrounded by the other
    d) Two objects touch, and one is completely surrounded by the other
    e) Two objects can be established as an inside/outside relationship
    f) Two objects can be established as an above/below relationship
    g) Distance can be measured from the centroids or from the boundaries
    h) Compound relationships are possible.
2. The choice of correct spatial relationships can be obtained by visually analyzing an object overlay decision map.
3. Object extraction skills can be learned and acquired if the software system is capable of teaching the user.
4. User models can be used as a means to generate low-fidelity object based layers.
5. The low-fidelity object-based lessons can be used as means to develop task-specific object extraction rules Finally, one of the possible rules from Table 7 can be used for the extraction of the Pentagon, yielding this rule base:

Region Possible_Pentagon: [is Hot_object 2014] [#0
    size 9=(150 500)] [surrounds Small_green_object 2012];     (20)

Figure 21:
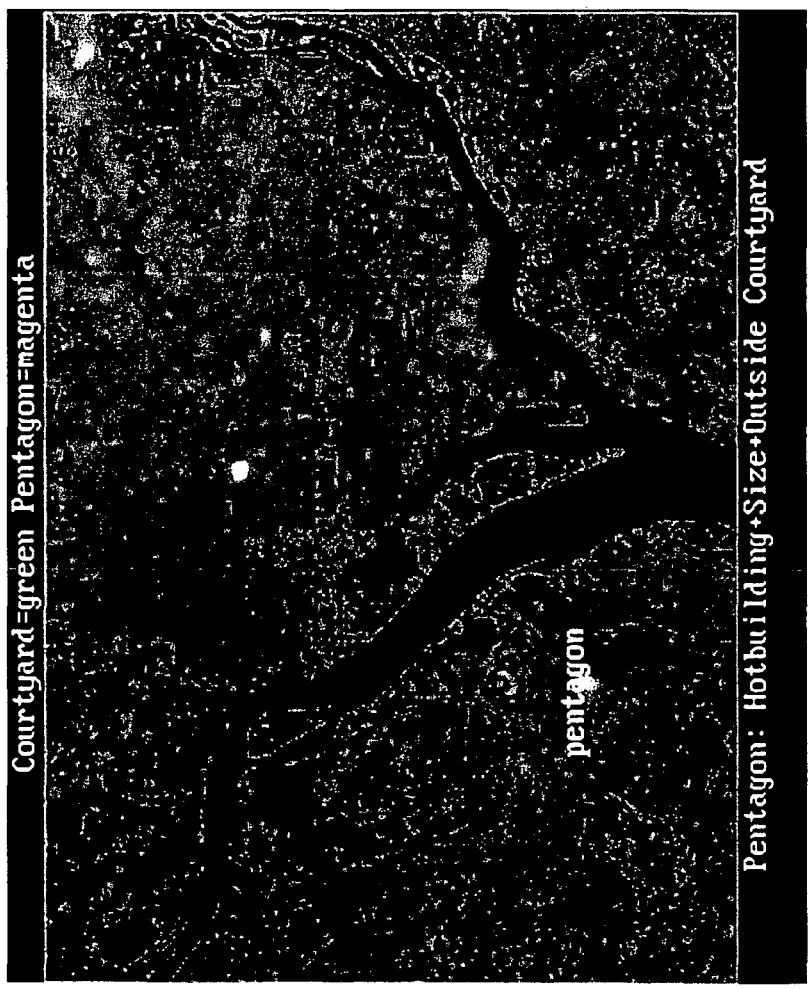
FIG. 21 is a decision map of the image containing the United States Pentagon area depicted in FIG. 20.

The decision map that reflects the foregoing rules is shown in FIG. 21.

As aforementioned, the present invention operates in the inventor's IMaG system and uses a pseudo-English programming language which includes processing and query language. The system integrates: (1) image processing, (2) multi-source analysis, and (3) GIS (Geographic Information Systems) into one single environment that possesses the tools to assist in solving smart imagery archiving problems. For example, the user can capture the knowledge of data experts and convert it to object based content retrieval algorithms; and then use these expert systems to extract the target objects in the scene, outlining and labeling each of them with appropriate text and color symbols automatically. As a result, the experts' knowledge is used directly to create an enhanced image that contains both textual and logical representations in addition to the original physical representation.

The invention uses a hyperspectral texture analysis, which is a bona fide image normalization process, and a feature enhancement process. It is a data compression process that does not lose any information, since none of the original information is discarded in the process. Three searching windows, a compressed image cube of hundreds of bands, can yield three transformations.

The hyperspectral texture transform does not lose the desired objects or information about the objects during the transform. In fact, in this invention, the textual transformation creates additional information for the object simply by adding a spatial dimension to the original data set.

A complementary approach is used for solving the problem of object detection by use of segmentation. A grid system is used to partition a scene into a set of grid cells or tiles, and then the likelihood that a man-made object is imbedded in a natural environment is determined. Once an area of interest (AOI) is determined, the user can proceed to extract and identify the object imbedded in the AOI by using a segmentor-based and/or a matcher-based classifier. A possibility for the grid cell based object detection system can is illustrated in U.S. Pat. No. 5,341,439, issued to the present inventor, hereby incorporated by reference.

The aforementioned LANDSAT™ data set has seven spectral bands. A HYDICE based hyperspectral cube has 210 image layers. While the user can select a number of bands that correspond to the spectral regions for a visual analysis, much of the information in the cube will most like be lost, simply because it is ignored. There is no difficulty in generating low-fidelity object-based information layers such as greenness and water models from a hyperspectral cube. The question is what additional information layers should be generated to teach users how to extract meaningful objects from a hyperspectral cube. Without this teaching process, user/machine and user/algorithm synergism will not occur.

To guide users to perform a successful object extraction task, a hyperspectral cube should be represented by a few image layers; at the same time they must not lose much of the information.

In a hyperspectral cube, a pixel on the ground is represented by a set of spectral readings, such as 210 reflectance based measurements. In linear algebra, the entire set of 210 values is called a vector. A 3×3 window has 9 vectors. If one uses the center point in the 3×3 grid as a control point, then computer correlation coefficients are obtained by coupling each of the 8 neighbors with the control point. Next, the control point is represented by the average of the 8 correlation coefficients.

If the 3×3 window is passed over the entire image cube with 50 percent overlap in both the row and column directions, one correlation coefficient based image transform can be generated from one image cube. This resultant image is a textural transform, because a correlation coefficient between two vectors measures the smoothness of the space between two ground pixels. For example, it the correlation coefficient is 1.0, there is no difference between these two ground pixels. This means there is no edge between them. Conversely, if the correlation coefficient is close to zero, the difference between these two ground pixels is extremely great.

How does one transition this hyperspectral texture analysis to an object based information layer? In this hyperspectral texture transform, each pixel is a measure of similarity to its neighbors. If a group of pixels all fall into one particular interval, such as 200 to 255, they form a low texture region. This region can represent a certain object on the ground. Suppose that a group of pixels fall into an interval from 0 to 20 in an 8-bit image. This region is basically composed of very dissimilar materials. Therefore, this texture transform is already a means for a user to generate low-fidelity objects.

Once the precise material of one ground pixel is known by matching it against a spectral library, the user knows the Size, Shape and the material type of that particular region that contains this known or matched pixel. This added spectral information can turn a low-fidelity object into a high-fidelity object.

This hyperspectral texture transform teaches the user how to merge spectral information with spatial information. No existing hyperspectral analysis software possesses this capability.

Suppose that (5×5) or (7×7) is used, instead of the above noted (3×3) moving window, to generate a hyperspectral texture transform. Each hyperspectral cube is thus transformed into a texture transform that is based on a greater ground distance between neighbors and the control point. In the end, multiple texture transforms can be generated from one hyperspectral image cube. The interpretation of each texture transform will be based on the characteristics of the objects as they are distributed on the ground.

A hyperspectral cube can be divided into several spectral zones, such as:

$$\text{Zone 1 in the visible spectral region (0.39 to 0.70 micro); Zone 2 in the near infrared region; Zone 3 also in the near infra region; and Zone 4 in the short wave infrared region (2.0 to 2.5 micron).} \quad (21)$$

One hyperspectral texture transform can then be generated in each spectral zone.

In reality, the same spatial differentiation model (i.e., (3×3) and (5×5) and so on) can be applied to the above noted spectral differentiated zones, yielding a set of spatial texture transforms in each spectral zone.

Finally, for visual analysis and guiding users to improve their object extraction skills, any three of the spectral-spatial based texture transforms in the color domain can be combined by using the standard color models:

$$\text{1. Hue transform 2. Saturation transform 3. Intensity transform 4. Color composite} \quad (22)$$

From each color domain, the user may learn something from the image data. Hsu and Huang have demonstrated that these transforms are extremely useful for detecting concealed fixed objects in both desert and off-shore regions. (SPIE, 1997.)

Fraction Plane

In FIG. 16, it can be seen that each pixel in a hyperspectral cube is a spectral curve. Suppose that this curve is based on a known object, and call it 100 percent material A. By the same principle, another pixel in the same image will generate another spectral curve. Suppose that this second curve can be matched to the first curve in terms of a correlation coefficient of 90 percent. The rest of the pixels in the image will also be matched against the first pixel in terms of a certain degree of goodness-of-fit. If this goodness-of-fit score is mapped in terms of an image surface, what is generated is, in fact, a fraction plane by using the first pixel as a standard.

Conventionally, the above noted standard pixel is considered to be a pure pixel, and the rest of the pixels are considered to be sub-pixels of the material represented by the pure pixel. In the pure vs. sub-pixel framework, researchers usually use matrix algebra to compute the mapping functions. As a result, a tremendous amount of computing time is required to generate a fraction plane. For example, it takes about two hours for a SPARC Station 2TM computer to compute an eigen value alone, based on a hyperspectral cube of Size approximately 210×500×500 pixels. Therefore, it is very difficult to achieve real-time generation of fraction planes by using matrix algebra based computing methods.

As demonstrated in previous sections, a user learns by interacting with the algorithms and the corresponding decision maps. The final rule set is usually a result of testing numerous working hypotheses, each hypothesis being generated by visually evaluating the test results. During the testing cycles, the user generally must create numerous base maps for finding the effects from certain potential contributing factors. In the context of hyperspectral image analysis, users will not be satisfied by using only a set of fraction planes. Most likely, the user will generate sets of fraction planes on the fly. For example:

The first set of fraction planes are based material types A, B, D, C; The second set of fraction planes can be based on material types F, G, H; The third set of fraction planes can be based on standard pixels, x, y, and z. (23)

Thus, devices for generating conventional fraction planes cannot achieve user/machine/data synergism. The real-time alternative method of the present system is definitely needed.

Conventional methods of matching objects in a signature domain are based largely on matrix theory. Thus, a matcher is usually associated with inverting a large-size matrix. This method is very computation intensive. For example, to obtain an eigen vector from an image cube of 200 bands, each band is of dimension 512×512 pixels. As mentioned above, it takes two hours, using a SUN SPARC station 2TM computer, to perform this task. But using a non-matrix theory-based method to perform the task reduces the computing to less than one minute using a Sun Ultra 10TM system (300 MHz single processor).

The inventive system allows extremely complex object matching by using only real number-based arithmetic. The steps, broadly stated, are:

(1) Treat a hyperspectral image cube as the sum of a set of discrete data centered on each spectral region, instead of conventional multivariate distribution.
(2) Obtain the mean (average) spectral reading value for each of the spectral regions. If there are 210 bands, it will have 210 means.
(3) Build a pseudo multivariate distribution for the data, but still keep each spectral region independent by using simple gravity model based statistics.

For example, the mean at spectral region 1 is influenced by the data of all other spectral regions. But the computation for this influence is only a gravity model:

$$m1 \times m2 / dij2 \quad (24)$$

Here m1 and m2 are 1; dij is the spectral difference between two bands.

(4) To determine how close or how far one object is from the other, 210 decisions are made, instead of a conventional, single decision.

The weight of each decision is $1/210$.

The final measure of how close it is will be a sum of 210 decisions. For example, if one object is compared to itself, it can have a perfect 100 percent match. The format is:

$1/210 + 1/210 \ldots$ up to the 210th decision=1

Suppose that one object results in a 50 percent match at every spectral region. It will have this hypothetical form: $0.5/210 + 0.5/210 + \ldots$ up to the 210th spectral region=0.5

(5) One of the results of this approach is a set of fraction planes. Suppose that each pixel in the image cube is compared to a calibrated spectra or a given pixel in the scene. The matching result is then output as an image. An image of percentage match is measured against a particular calibration sample. Set 100 percent match as 255; no match as 0. The result is a conventional 8-bit graytone image. Object extraction can then be performed based on this fraction plane based image.

Information processing in the inventive system is also achieved by using a batch file approach, as discussed hereinabove with respect to FIG. 2. In this case, both the user 104 (FIG. 1) and GUI components 102 are dormant.

Two object-extraction examples that use these photointerpreters' vocabularies are given in FIGS. 5, 6 and 9 and described in the aforementioned parent patent application Ser. No. 08/759,280. The vehicle used for performing this object-recognition process by using a human-like language centered on concepts that are utilized by photointerpreters is the IMaG System described in U.S. Pat. No. 5,631,970.

It is a fact that fewer steps in computing results in a real time analysis. When the computing operations were limited to plus(+), minus(−), multiplication(×), and division(/) in the real number domain, real time generation of fraction planes from a hyperspectral cube is achievable. The question is how meaningful are those fraction planes. The answer lies in how valid is the method.

Conventional approaches to hyperspectral image data analysis are largely based on matching a given spectral curve with a library of spectral signatures by using complex methods, including multivariate statistical methods, curve fitting, regression analysis and neural networks. These methods perform a matching analysis by using the totality of the curve at one time.

The proposed real number arithmetic approach will treat the curve as a sum of multiple tests of models, and each model is restricted to a particular spectral region. In other words, if there are 210 spectral regions in a hyperspectral cube, there will be at least 210 models for testing of goodness-of-fit.

Suppose that each model has a maximum score of 1. Then, the total set of testings will have a maximum test score of 210. For the convenience of mapping these test scores to an 8-bit image, these scores can be used as they are, without any scaling. Then, the largest pixel brightness value will be 210. The rest of the pixels values will be a fraction of the maximum score. Therefore, the remaining task is how to perform matching in each individual model.

Since what is desired is to achieve real time results, the computing operations should be limited to only plus, minus, multiply and divide.

Using a Gravity Model

Suppose that five standard signatures occur, and that each is represented by only one pixel or one vector. Since each testing model is restricted to one spectral region, each model will have only five points.

Now a given unknown point is included with this 5-point constellation. It will be attracted to each of the 5 points according to Newton's gravity model. In the end, this unknown point will be settled at a balanced location. At this point, the relationship of this newly-settled unknown point can be calculated with respect to the constellation of points, with its closest standard point based on the x-axis value.

Suppose that this standard point has an x-axis value of 50, and the counterpart of the newly-settled unknown point is 40 or 60 (i.e., 10 points off in absolute terms). The score achieved by this model testing is (50−10)/50=0.80.

In many cases, a known object or material can be represented by a set of samples. In the previous discussion, a standard is to be represented by a group of pixels that can be inputted by a set of vectors or by collecting manually from the input image cube. These standards can be denoted as:

Given To be Determined $$a\_1, a\_2, a\_3, \ldots, a\_n \text{ for Standard A Computed Centroid: } a\_c \; b\_1, b\_2, b\_3, \ldots, b\_n \text{ for Standard B Computed Centroid: } b\_c \; m\_1, m\_2, m\_3, \ldots, m\_n \text{ for Standard B Computed Centroid: } m\_c \qquad (25)$$

Equation (25) indicates that there are multiple points for each calibration sample, and the centroid can be computed for each standard. Ordinarily, for row 1, the average of a's can be used to represent a_c. This model, however, cannot take the effect of the other standards into account.

Instead, by using a gravity model, begin with a_1, b_1, . . . and m_1. Next, compute a new value for a_2 using the gravity model, yielding a_2_new. Next, compute a new value for a_3 using the gravity model, yielding a_3_new, until a new value for a_n is computed, yielding a_n_new.

Lastly, an average for all of the a_x_new's yields:

$$a\_c. \qquad (26)$$

Once a_c, b_c, . . . , m_c are fixed, the same centroid values can be computed for the rest of the models. In this example, there will be 210 models. At this point, there is no structural difference between the current system and the one-point based system discussed above.

The models of Eqs. (25) and (26) have been tested by the inventor, using a HYDICE image cube of size 210 channels, each channel having 1155×320 pixels as the input. Less than 60 seconds are needed to generate six fraction planes.

Confidence Level

Figure 22:
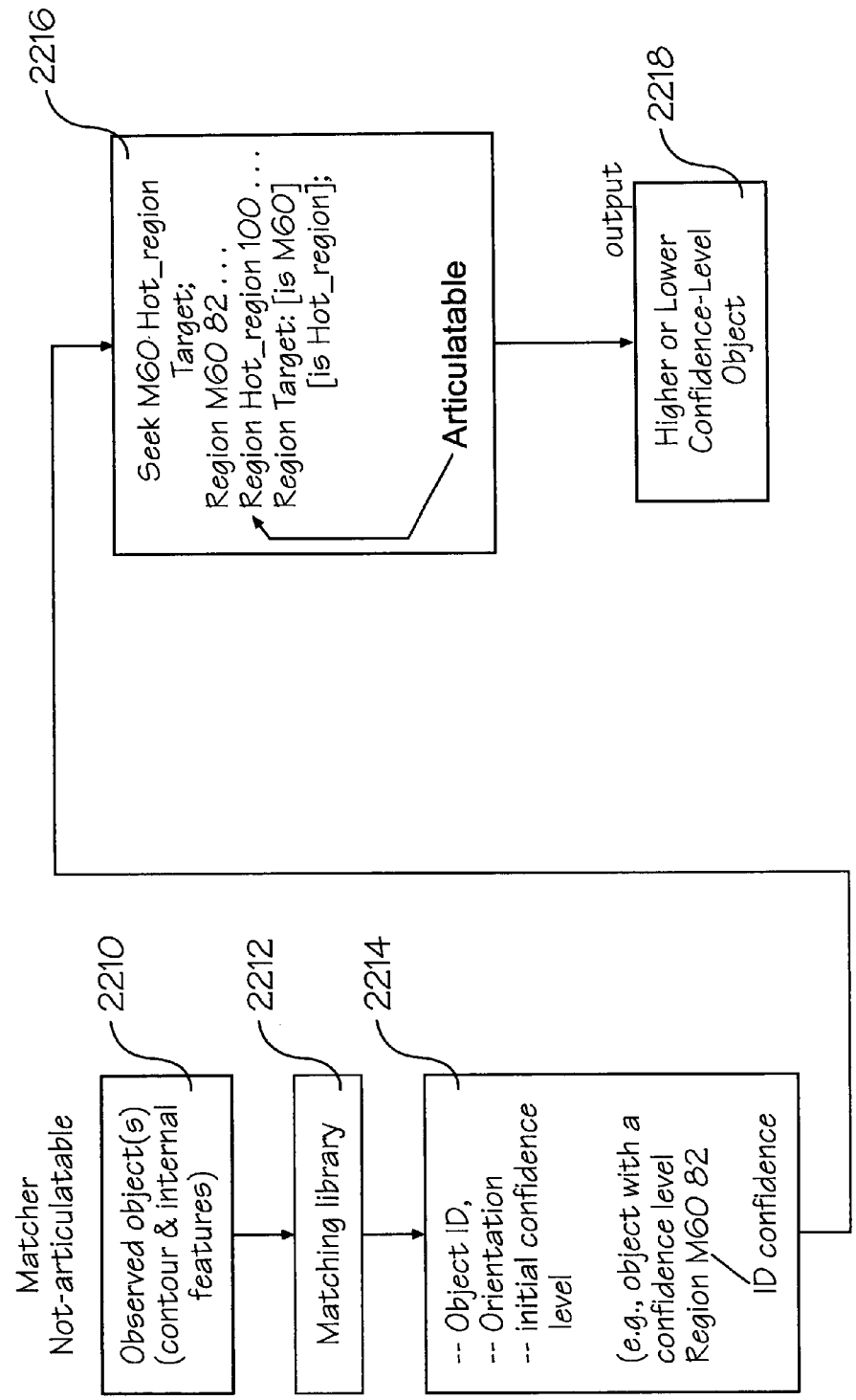
FIG. 22 is a flowchart of identification with initial confidence level as processed by the natural language processor of the invention.

Referring now to FIG. 22, there is shown a flowchart of the inventive process using the natural language processor of the present invention. An object is observed, step 2210, which object includes a contour and, possibly, one or more internal features. The observed object is then compared against elements, not shown, of the matching library, step 2212. This comparison results in an identification of the object, its orientation, and an initial confidence level associated therewith, step 2214. For example, the identified object may be an M60 tank, the initial confidence level of which is 82 (percent). It should be understood that the mechanism for calculating the confidence level in this example is done by using a 2-D/3-D matching library, which is different from the one based on a 1-D, spectral library. The 1-D spectral (matching) library is based on real number processing, as opposed to mere binary, full numbers. For purposes of this description, the confidence level is represented as a percentage from 1% to 100%.

Once the object and its initial confidence level have been determined, step 2214, the system seeks an internal feature, step 2216. In this case, a hot region of the object is detected, with a confidence level of 100 (percent). Thus, the M60 tank, of which the confidence level was initially only 82%, has been further identified as having a hot region.

Therefore, the likelihood of the object being an M60 tank has increased, so that the resultant confidence level of the object is greater than its initial confidence level of 82.

It can be seen that the object (known now as an M60 tank) was not articulatable in the early steps of the process; but the object became articulatable when the combination or gluing together of the initial object and its hot region was performed. In other words, when additional evidence is provided to the initial object, the confidence level can change, either upwardly (as in the aforementioned case) or downwardly. The confidence level output and final resolution is shown as step 2218.

Figure 23:
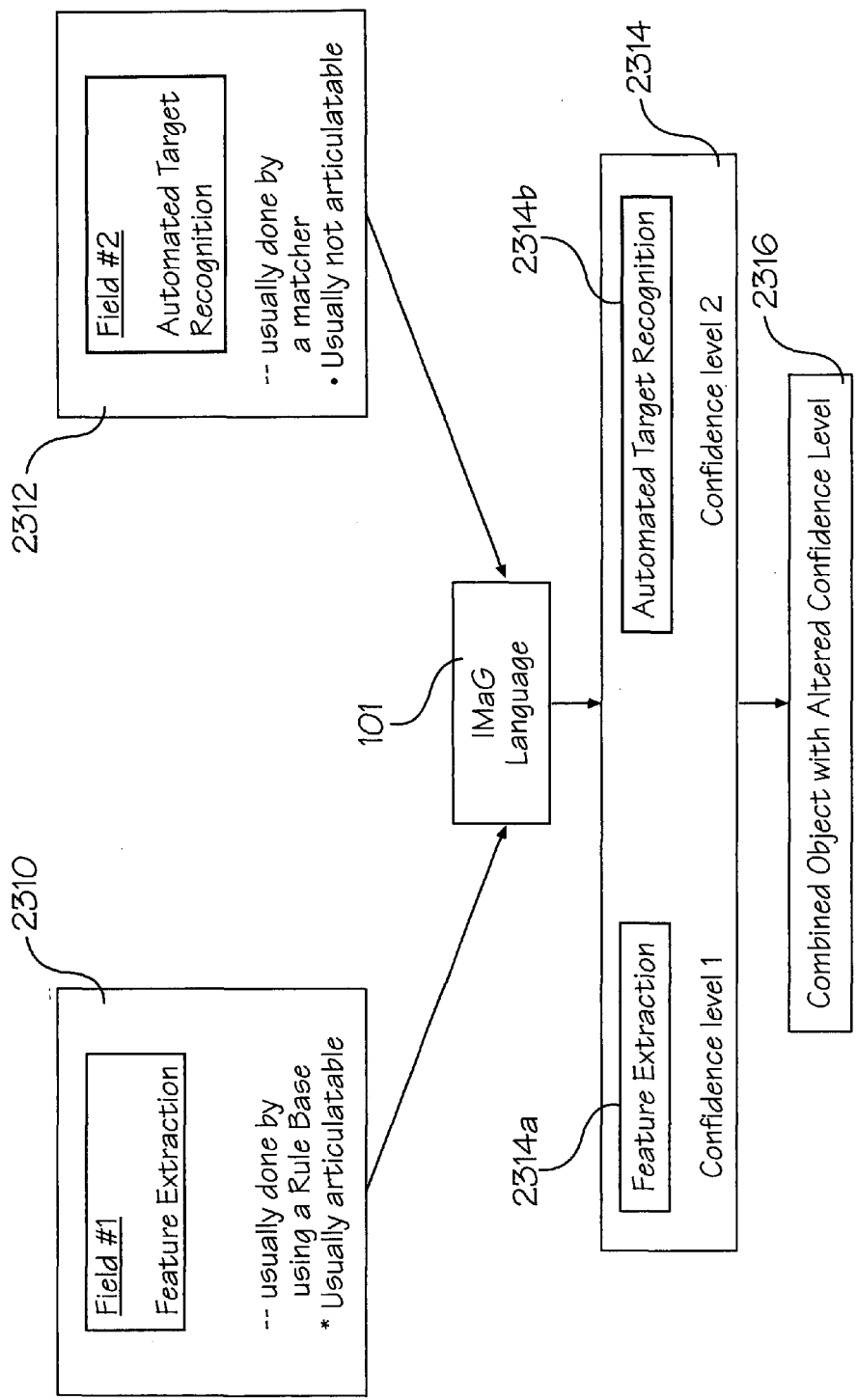
FIG. 23 is a flowchart of an example of a real world pattern recognition of a mapping, charting and geodesy field.

Referring now to FIG. 23, there is shown a real world pattern recognition flowchart of an example of a mapping, charting and geodesy field. A first field is provided for feature extraction, step 2310. Feature extraction usually occurs by using a rule base, not shown. The object that is the subject of feature extraction is usually articulatable.

A second field, shown in this example, is provided and used for automatic target recognition (ATR), step 2312. This step is usually performed by the sort of matcher shown, for example, in FIGS. 14 and 15. It should be understood that, in accordance with the aforementioned pending patent application Ser. No. 08/759,280, the matching operation can be performed in real time. The object that is the subject of automatic target recognition is generally not articulatable.

Both fields number 1 and number 2 are applied to the natural language processor 101, which in turn combines both fields and then facilitates object identification and respective confidence levels, step 2314. The object identification is specifically found during feature extraction, step 2314a, and during automatic target recognition, step 2314b. The interaction of the two processes 2314a and 2314b results in initial confidence levels 1 and 2, respectively. Once the objects and respective confidence levels are combined, however, the combined object identification and its modified confidence level are obtained, step 2316.

FIG. 24 depicts programming code representing a combination of two sample objects, each having its own initial confidence level. The first object is a small, round region 2410, the confidence level of which is 90 (percent), depicted by reference numeral 2412. Also analyzed is a second object, 2414, which is a bright region, the confidence level of which is 70 (percent) 2416. The combinatorial word "is", step 2418, is used to identify both regions within the programming statement. In this case, the system is directed to display the object in the color GREEN if the resultant confidence level is greater than 50 (percent), step 2420; and to display the object in RED if the resultant confidence level is greater than 70 (percent), step 2422.

Figure 13:
FIG. 13 depicts an image of six possible water tanks, without a false alarm, based on the presence and identification of shadows.
Figure 25:
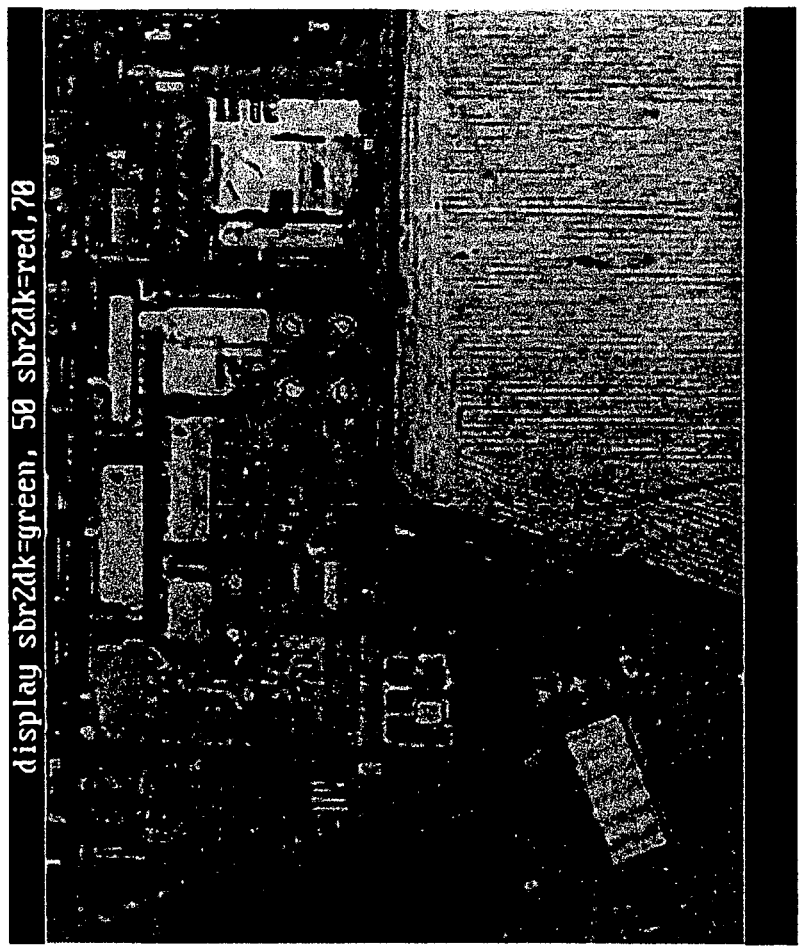
FIG. 25 is the image used in FIGS. 12 and 13 but displaying resultant confidence levels in color.

FIG. 25 is the image originally used in FIGS. 12 and 13, but now displaying the objects highlighted in RED, indicating that the resultant confidence level is greater than 70 (percent).

Referring now to FIG. 26, there is shown programming code representing the combination of the two sample objects originally described with reference to FIGS. 24 and 25, each having its own initial confidence level. In this case, however, the threshold levels of composite confidence level is changed so as to display the resulting objects in GREEN, step 2610, if the confidence level is greater than 70 (percent), step 2612. Similarly, the objects will be painted RED, step 2614, only if the resultant confidence level is greater than 80 (percent), step 2616.

Figure 27:
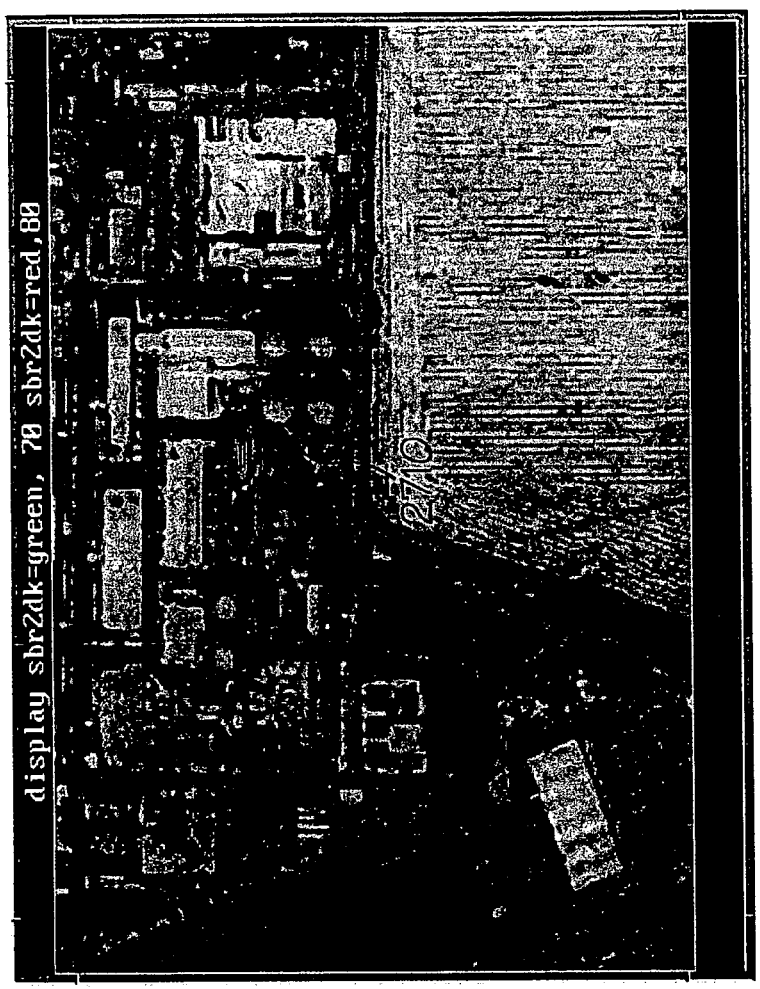
FIG. 27 is an image that indicates the resultant confidence levels of objects with upper and lower limits.

As can be seen from the accompanying FIG. 27, the objects are painted in green, step 2710, indicating that the composite confidence level is greater than 70 (percent) but less than 80 (percent). From this procedure, it can be seen that the user is aided in a display or a series of displays that focus or narrow the confidence levels of composite objects without actually having to calculate the levels of confidence. It can also be seen that both the system and the user are capable of interactive learning in accordance with the foregoing process steps.

In this way, the user may modify the classification behavior of the system at any point during the process. In other words, the system need not be operating under automatic mode entirely, but may be the subject of interactivity.

The user may wish to modify the system's classification behavior based on evidence observed or known by the user himself. For example, the user may feel less confident than the system initial confidence level, based on the user's own experience. This could occur, for example, when the user observes from the image that a hot region is actually a bonfire, rather than a hot engine. Other types of evidence can also be readily combined, such as the height of objects, the location on which such objects are disposed, spatial relationships among objects, etc.

Moreover, the system is adapted to respond to the cumulative effect of previously made determinations. Thus, the user and/or the system can build on decisions and observations made in earlier experiments. Objects that have already been defined can be reintroduced into the system for ongoing processing.

Since other modifications and changes varied to fit particular operating requirements and environments will be apparent to those skilled in the art, this invention is not considered limited to the example chosen for purposes of this disclosure and covers all changes and modifications which does not constitute departures from the true spirit and scope of this invention.

For example, it has been found that any task, relatively simple or complex, in any subject, can be learned by an unsophisticated, but trainable user. Thus, the foregoing technique is applicable to a wide variety of subject matter, especially when combined with simulation systems, in fields including, but not limited to: medicine (surgery), electronics, science, architecture, cooking, language, crafts, music, engine repair, aircraft and other machine operation, inventory control, and business.

Having thus described the invention, what is desired to be protected by Letters Patent is presented in the subsequently appended claims.

What is claimed is:

1. A method of training a photo analyst in the field of photo interpretation to identify an object in an image, the steps comprising:
   a) providing a programming language comprising a syntax including a lexicon of a photo interpreter and adapted for describing an object to be identified in an image;
   b) providing a computer system for executing said programming language;
   c) formulating a description of an object to be identified in an image using said programming language;
   d) submitting said formulated description to said computer system; and
   e) providing graphical feedback from said computer system indicating the actual object identified in said image by said formulated description.

2. The method of training a photo analyst in the field of photo interpretation as recited in claim 1, the steps further comprising:
   f) using said graphical feedback and said programming language to re-formulate a description of said object to be identified in an image; and
   g) submitting said re-formulated description to said computer system.

3. The method of training a photo analyst in the field of photo interpretation as recited in claim 2, wherein said using step (f) and said submitting step (g) are performed iteratively.

4. The method of training a photo analyst in the field of photo interpretation as recited in claim 3, wherein each iteration of said using step (f) and said submitting step (g) results in said graphical feedback more closely resembling said object to be identified in an image.

5. The method of training a photo analyst in the field of photo interpretation as recited in claim 1, the steps further comprising:
   f) graphically indicating a region of an image to be identified to said computer system; and
   g) using said computer system to formulate a description of said region of an image in terms of said syntax of said programming language.

6. The method of training a photo analyst in the field of photo interpretation as recited in claim 1, wherein said computer system comprises a database of extraction rules, said database being updateable with a new extraction rule derived from a description of an object formulated in said programming language.

7. A method of training a photo analyst in the field of photo interpretation to identify an object in an image, the steps comprising:
   a) providing a programming language comprising a syntax including a lexicon of a photo interpreter and adapted for describing an object to be identified in an image;
   b) providing a computer system for executing said programming language;
   c) submitting a description of an object to be identified in an image to said computer system, said description comprising said syntax of said programming language; and
   d) providing graphical feedback from said computer system indicating the actual object identified in said image by said formulated description.

8. The method of training a photo analyst in the field of photo interpretation as recited in claim 7, the steps further comprising:
   e) using said graphical feedback and said programming language to re-formulate a description of said object to be identified in an image; and
   f) submitting said re-formulated description to said computer system.

9. The method of training a photo analyst in the field of photo interpretation as recited in claim 8, wherein said using step (e) and said submitting step (f) are performed iteratively.

10. The method of training a photo analyst in the field of photo interpretation as recited in claim 9, wherein each iteration of said using step (e) and said submitting step (f) results in said graphical feedback more closely resembling said object to be identified in an image.

11. The method of training a photo analyst in the field of photo interpretation as recited in claim 9, the steps further comprising:
   e) graphically indicating a region of an image to be identified to said computer system; and f) using said computer system to formulate a description of said region of an image in terms of said syntax of said programming language.

12. The method of training a photo analyst in the field of photo interpretation as recited in claim 9, wherein said computer system comprises a database of extraction rules, said database being updateable with a new extraction rule derived from a description of an object formulated in said programming language.

* * * * *